(12) United States Patent
Jo et al.

(10) Patent No.: US 10,006,600 B2
(45) Date of Patent: Jun. 26, 2018

(54) AUTOMOTIVE LAMP

(71) Applicant: SL Corporation, Daegu (KR)

(72) Inventors: Jin Ho Jo, Gyeongsanbu-do (KR); Jinyoung Kim, Gyeongsanbu-do (KR); Sujeong Kwon, Gyeongsanbu-do (KR); Seung Woo Seo, Gyeongsanbu-do (KR); Kihae Shin, Gyeongsanbu-do (KR); Byoungki Ji, Gyeongsanbu-do (KR)

(73) Assignee: SL Corporation, Daegu (KR)

( * ) Notice: Subject to any disclaimer, the term of this patent is extended or adjusted under 35 U.S.C. 154(b) by 0 days. days.

(21) Appl. No.: 15/357,599

(22) Filed: Nov. 21, 2016

(65) Prior Publication Data
US 2017/0146212 A1    May 25, 2017

(30) Foreign Application Priority Data

Nov. 20, 2015 (KR) .......................... 10-2015-0163572

(51) Int. Cl.
| | |
|---|---|
| *F21S 8/10* | (2006.01) |
| *G02B 27/22* | (2018.01) |
| *F21S 43/20* | (2018.01) |
| *F21S 43/31* | (2018.01) |
| *F21S 43/14* | (2018.01) |

(52) U.S. Cl.
CPC .............. *F21S 43/26* (2018.01); *F21S 43/14* (2018.01); *F21S 43/31* (2018.01); *F21S 48/215* (2013.01); *F21S 48/2212* (2013.01); *F21S 48/234* (2013.01); *G02B 27/2214* (2013.01)

(58) Field of Classification Search
None
See application file for complete search history.

(56) References Cited

U.S. PATENT DOCUMENTS

| | | | | |
|---|---|---|---|---|
| 5,455,747 | A * | 10/1995 | Aoyama | B60Q 1/2607 359/19 |
| 2015/0131297 | A1* | 5/2015 | Thompson | G02B 6/0053 362/326 |
| 2015/0192728 | A1* | 7/2015 | Thompson | G02B 6/0043 362/624 |
| 2015/0331169 | A1* | 11/2015 | Jang | G02B 6/005 362/607 |

\* cited by examiner

*Primary Examiner* — Ashok Patel
(74) *Attorney, Agent, or Firm* — Mintz Levin Cohn Ferris Glovsky and Popeo, P.C.; Kongsik Kim; Jay Jhongwoo Peck

(57) ABSTRACT

Provided is an automotive lamp which forms a stereoscopic image by transmitting light of a light source through a lenticular lens. The automotive lamp includes: a light source; and a light pattern forming component which forms a plurality of light patterns by transmitting light emitted from the light source, wherein the light pattern forming component enables a light pattern of a different image to be observed based on a viewing angle, and light patterns of different images provide a continuous motion as the viewing angle changes sequentially in a specific direction.

12 Claims, 47 Drawing Sheets

AUTOMOTIVE LAMP

CROSS-REFERENCE TO RELATED APPLICATION

This application claims the benefit of Korean Patent Application No. 10-2015-0163572 filed on Nov. 20, 2015, the disclosure of which is incorporated herein by reference in its entirety.

BACKGROUND

1. Field of Disclosure

The present inventive concept relates to an automotive lamp, and more particularly, to an automotive lamp configured to form a stereoscopic image by transmitting light of a light source through a lenticular lens.

2. Description of the Related Art

Generally, a vehicle includes a lamp module having a lighting function and a signaling function. The lighting function is configured to enable the driver of the vehicle to detect objects around the vehicle while driving during low light conditions. The signaling function is used to inform other vehicles and road users of the vehicle's driving state. For example, a headlamp and a fog lamp are designed for the lighting function, and a turn signal lamp, a tail lamp, a brake lamp, and a side marker are designed for the signaling function. Recently, the lamp module has gone beyond simply performing the lighting function and the signaling function. The lamp module improves visibility and awareness about a particular manufacturer's product by emitting a particular form of light.

The above information disclosed in this section is merely for enhancement of understanding of the background of the invention and therefore it may contain information that does not form the prior art that is already known in this country to a person of ordinary skill in the art.

SUMMARY

The present disclosure provides an automotive lamp configured to form a stereoscopic image by transmitting light emitted from a light source through a lenticular lens. However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an aspect of the inventive concept, there is provided an automotive lamp including: a light source; and a light pattern forming component which forms a plurality of light patterns by transmitting light emitted from the light source, wherein the light pattern forming component enables a light pattern of a different image to be observed based on a viewing angle, and light patterns of different images provide a continuous motion as the viewing angle changes sequentially in a specific direction.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
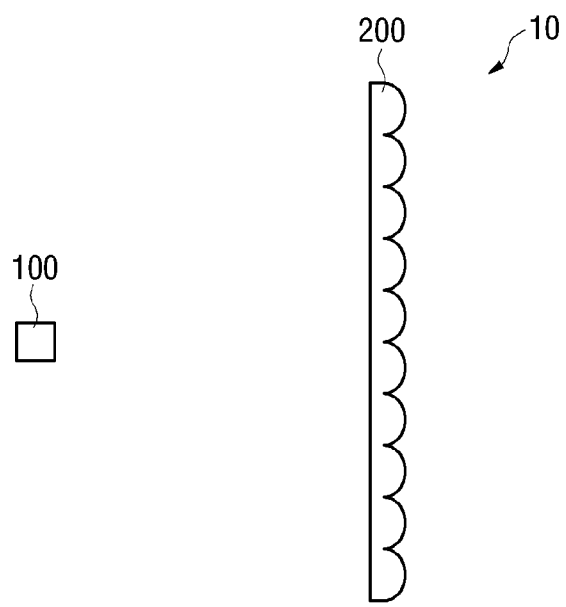
FIG. 1 illustrates an exemplary automotive lamp according to an exemplary embodiment of the present disclosure.

Advantages and features of the inventive concept and methods of accomplishing the same may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the invention to those skilled in the art, and the inventive concept will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Figure 2:
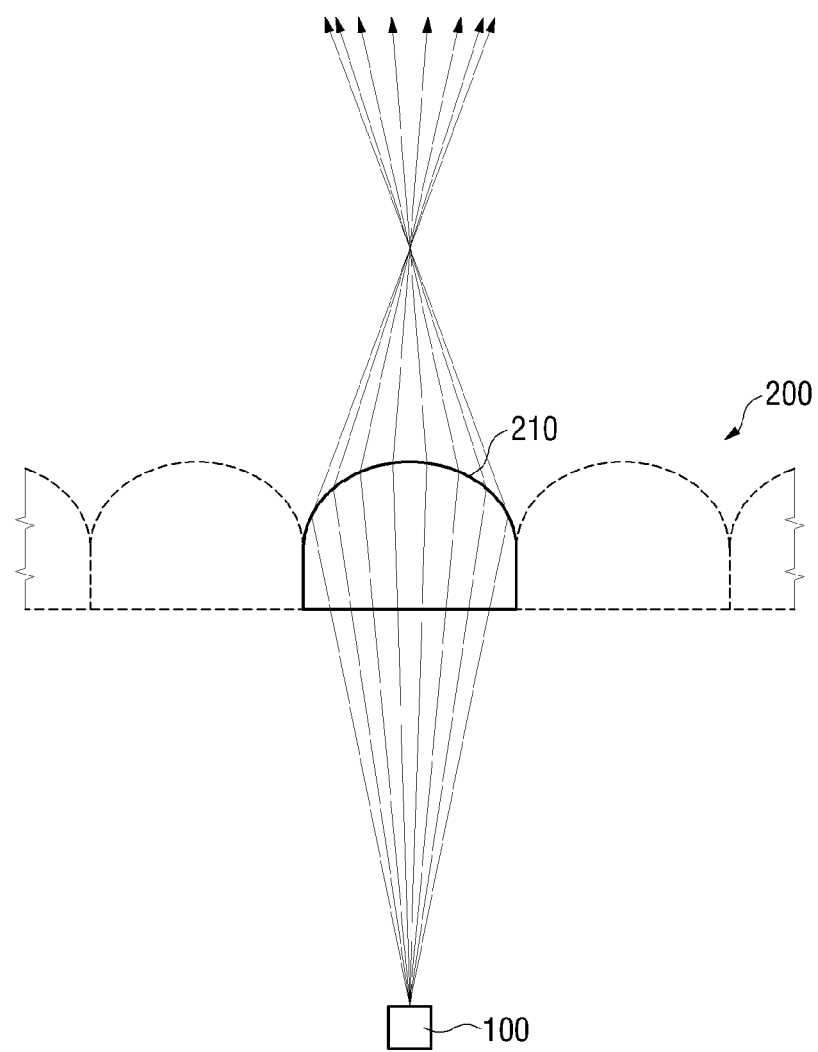
FIG. 2 illustrates an exemplary diffusion of light by diffusion lenses according to an exemplary embodiment of the present disclosure.

FIG. 1 illustrates an exemplary automotive lamp 10 according to an exemplary embodiment. FIG. 2 illustrates the diffusion of light by diffusion lenses 210 according to an exemplary embodiment. Referring to FIGS. 1 and 2, the automotive lamp 10 may include a light source 100 and a lenticular lens 200. The light source 100 may be configured to irradiate light. Light of the light source 100 may be irradiated in the form of direct light or indirect light. In particular, a reflector (not illustrated) which reflects light may be provided around the light source 100, and a light inducer (not illustrated) such as a light guide may also be provided. The lenticular lens 200 may be configured to form a light pattern having a specific shape by diffusing incident light. The lenticular lens 200 may include one or more diffusion lenses 210. The diffusion lenses 210 may be shaped like cylinders. The diffusion lenses 210 may be positioned adjacent to each other to form the lenticular lens 200.

Referring to FIG. 2, each of the diffusion lenses 210 may diffuse incident light. Light incident upon a rear surface of each of the diffusion lenses 210 may be diffused in a plurality of directions as the light emerges from a front surface of the diffusion lens 210. A direction in which light is diffused may be determined to be a direction perpendicular to a long axis of each of the diffusion lens 210. In other words, light may be diffused as it is refracted by a curved component (i.e., the front surface) of each of the diffusion lenses 210. The light source 100 used herein may be a light-emitting diode (LED). A pattern of light irradiated from the light source 100 such as an LED may be in the shape of a dot. In particular, when an observer gazes at an LED, he or she may perceive a light pattern in the shape of a dot. When a light pattern in the shape of a dot enters one or more diffusion lenses 210 that form the lenticular lens 200, each diffusion lens 210 may be configured to diffuse the incident light in a direction perpendicular to its long axis. A light pattern diffused by each diffusion lens 210 may be connected to an adjacent light pattern, thereby forming a light pattern in the shape of a line (e.g., a linear light pattern).

Figure 3:
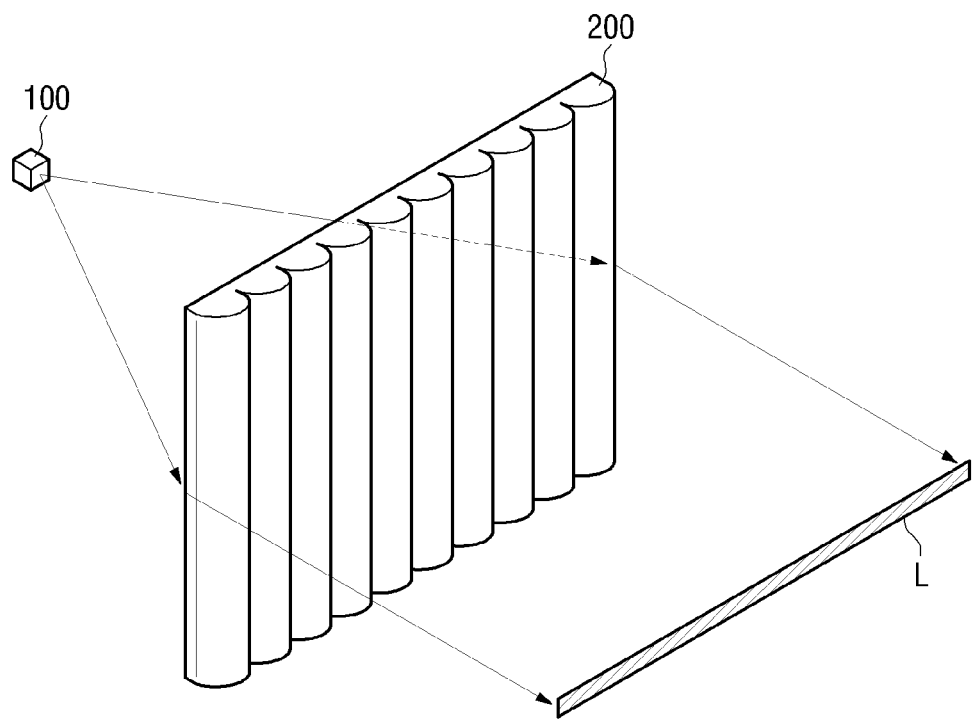
FIGS. 3 and 4 illustrate exemplary formation of a light pattern by a lenticular lens according to an exemplary embodiment of the present disclosure.
Figure 4:
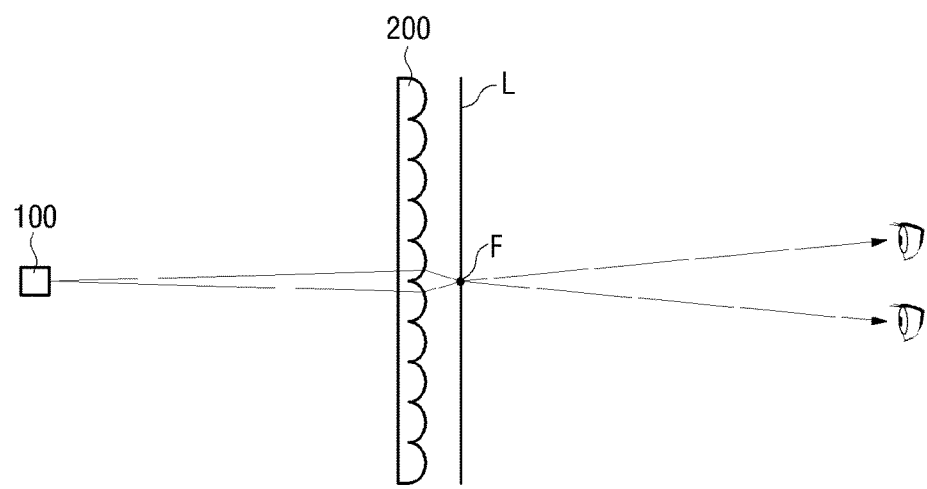

FIGS. 3 and 4 illustrate the formation of a light pattern by the lenticular lens 200 according to an exemplary embodiment. Referring to FIGS. 3 and 4, a light pattern may be formed as light irradiated from the light source 100 enters the lenticular lens 200. As a dot-shaped light pattern of the light source 100 may be diffused by each diffusion lens 210 of the lenticular lens 200, a light pattern L may be formed in the shape of a straight line and perceived by an observer. The observer may perceive one light pattern L in the shape of a straight line from any direction.

Light irradiated from the light source 100 may enter the lenticular lens 200 through a plurality of locations on the lenticular lens 200. In addition, the incident light may be refracted by each diffusion lens 210 as described above. For example, the incident light may be diffused by a plurality of diffusion lenses 210 to produce a plurality of beams, and the beams cross each other at a location separated from a front part of the lenticular lens 200 by a specific distance to enter both eyes of the observer. Therefore, a location at which the light pattern L in the shape of a straight light may be perceived by the observer is not a surface of the lenticular lens 200 but a location F separated from the lenticular lens 200 by a specific distance. In particular, it may be understood that the lenticular lens 200 forms a light pattern by transmitting light.

In this way, as light may be transmitted through the lenticular lens 200 that includes one or more diffusion lenses 210, the light pattern L in the shape of a straight line may be formed. For example, the diffusion lenses 210 may have various widths and curvatures. The form of a light pattern perceived may vary according to the width and curvature of the diffusion lenses 210.

Figure 5:
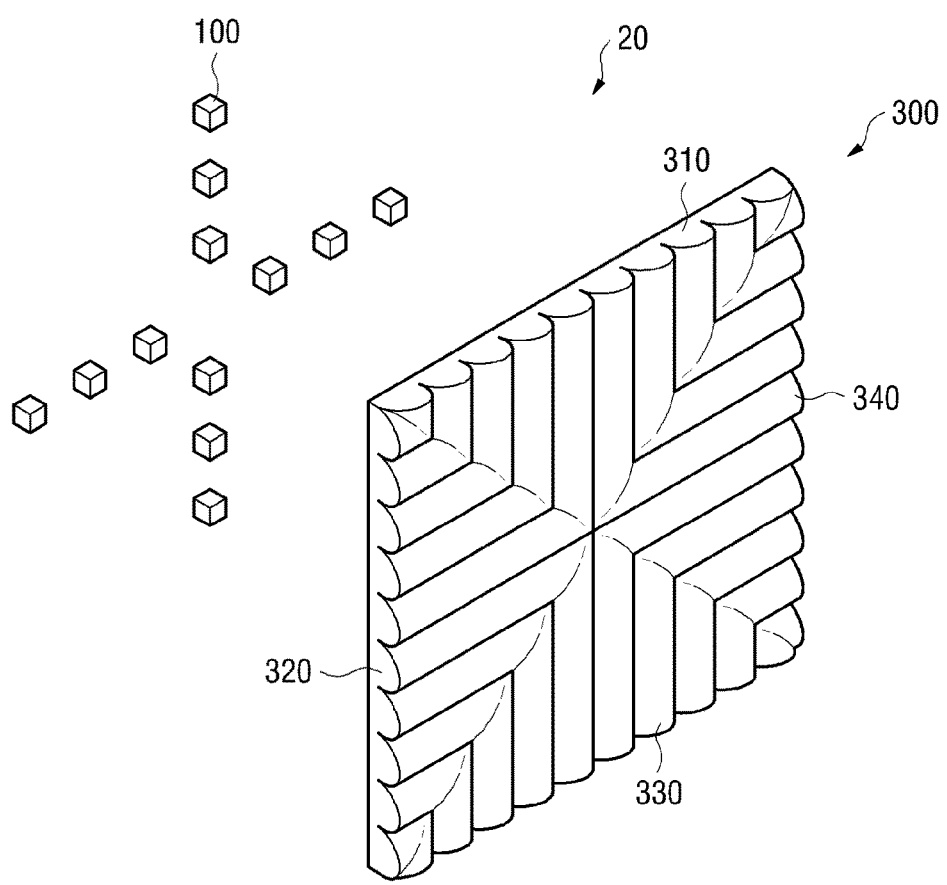
FIGS. 5 through 7 illustrate an exemplary automotive lamp according to an exemplary embodiment of the present disclosure.
Figure 6:
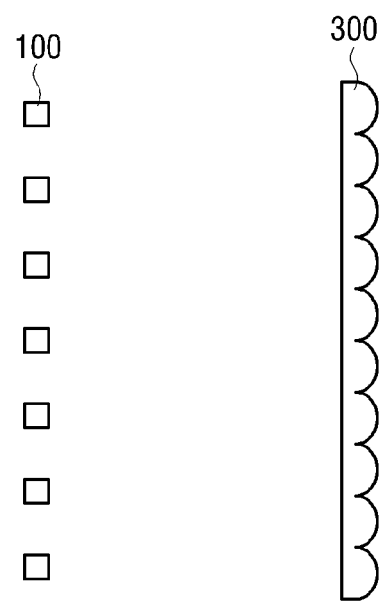
Figure 7:
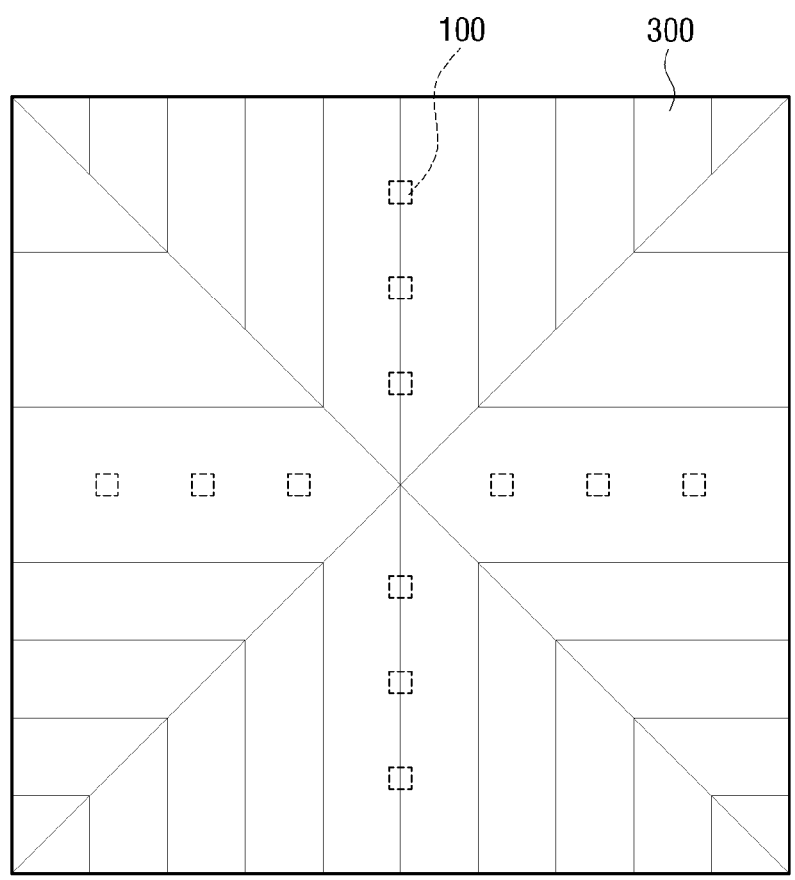

FIGS. 5 through 7 illustrate an automotive lamp 20 according to an exemplary embodiment. Specifically, FIG. 5 is a perspective view of the automotive lamp 20, FIG. 6 is a side view of the automotive lamp 20, and FIG. 7 is a front view of the automotive lamp 20. Referring to FIGS. 5 through 7, the automotive lamp 20 may include a light source 100 and an optical component 300. The light source 100 irradiates light. Since the light source 100 has been described above, a detailed description of the light source 100 will be omitted. However, the automotive lamp 20 according to the current exemplary embodiment may include a plurality of light sources 100 corresponding to a plurality of lenticular lenses 310 through 340.

The optical component 300 may be configured to form light patterns by transmitting light. The optical component 300 may include a plurality of lenticular lenses 310 through 340 disposed on the same surface. The lenticular lenses 310 through 340, each including one or more diffusion lenses, may be disposed on the same surface such that long axes of the diffusion lenses included in each of the lenticular lenses 310 through 340 are not parallel to long axes of the diffusion lenses included in an adjacent lenticular lens. For example, the same surface on which the lenticular lenses 310 through 340 are disposed may be a flat surface or a curved surface. Hereinafter, a case where the same surface on which the lenticular lenses 310 through 340 are disposed is a flat surface will mainly be described. Each of the lenticular lenses 310 through 340 may have boundaries which are formed at oblique angles to the long axes of the diffusion lenses and contact adjacent lenticular lenses.

In FIGS. 5 and 7, the optical component 300 that includes four lenticular lenses 310 through 340 is illustrated. Each of the lenticular lenses 310 through 340 may have boundaries which are formed at oblique angles to the long axes of the diffusion lenses. Therefore, the lenticular lenses 310 through 340 may form one optical component 300 as respective boundaries of adjacent lenticular lenses meet each other.

Since each boundary may be formed at an oblique angle to the long axes of the diffusion lenses, a straight line-shaped light pattern formed by each lenticular lens may meet a straight line-shaped light pattern formed by an adjacent lenticular lens at each boundary. The position of a light pattern may be determined by the position of a light source 100. Therefore, a plurality of light sources 100 may be positioned such that straight line-shaped light patterns formed respectively by adjacent lenticular lenses meet each other at a boundary between the adjacent lenticular lenses. In FIGS. 5 and 7, three light sources 100 are positioned to correspond to each lenticular lens. Each lenticular lens may form three light patterns in the shape of straight lines as light irradiated from the three light sources 100 may be incident upon the lenticular lens.

Figure 8:
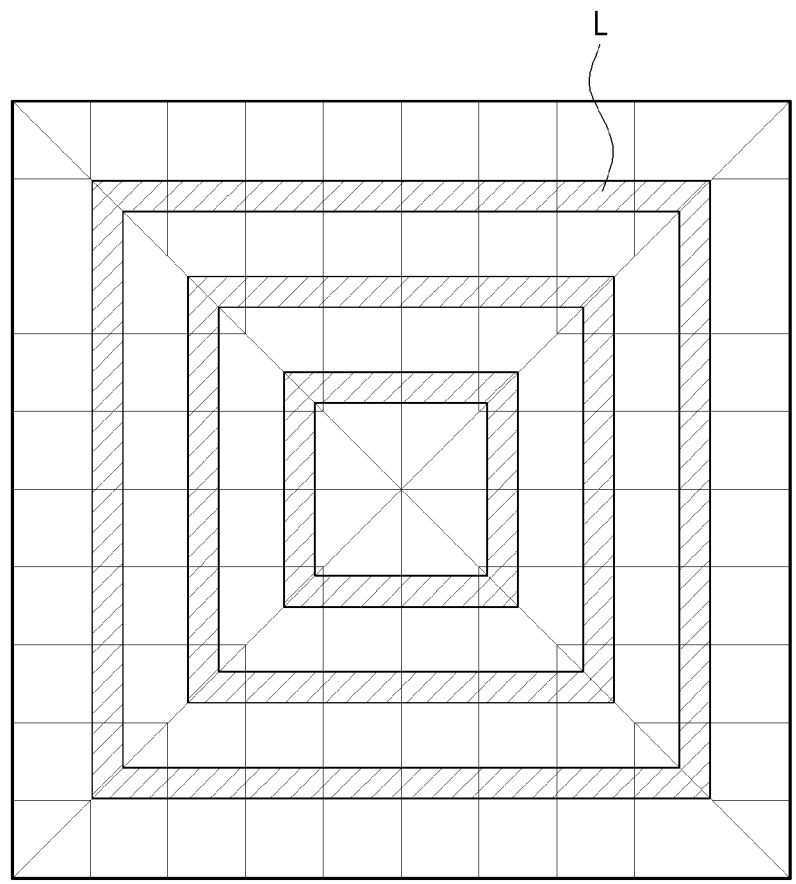
FIG. 8 illustrates exemplary light patterns formed by the automotive lamp of FIGS. 5 through 7.

FIG. 8 illustrates light patterns formed by the automotive lamp 20 of FIGS. 5 through 7. Referring to FIG. 8, each lenticular lens may form three light patterns L in the shape of straight lines. In addition, each light pattern L may meet another light pattern L at a boundary. In FIG. 8, three light patterns L formed by each lenticular lens meet three light patterns L formed by an adjacent lenticular lens at a boundary. In particular, a plurality of straight line-shaped light patterns L formed by a plurality of lenticular lenses 310 through 340 as light irradiated from a plurality of light sources 100 transmits through the lenticular lenses 310 through 340 may form closed figures. To this end, the shape of each boundary between adjacent lenticular lenses and the position of the light sources 100 may be determined appropriately.

According to some exemplary embodiments, some or all of light patterns formed by each lenticular lens may not meet light patterns formed by an adjacent lenticular lens. In addition, as illustrated in FIGS. 5 and 7, since each lenticular lens may be shaped like an isosceles triangle, the entire light pattern formed by the optical component 300 may be shaped like a rectangle. However, the shape of the lenticular lenses 310 through 340 that form the optical component 300 may be not limited to the isosceles triangle, and the lenticular lenses 310 through 340 may have any shape as long as their boundaries are oblique to the long axes of the diffusion lenses.

Figure 9:
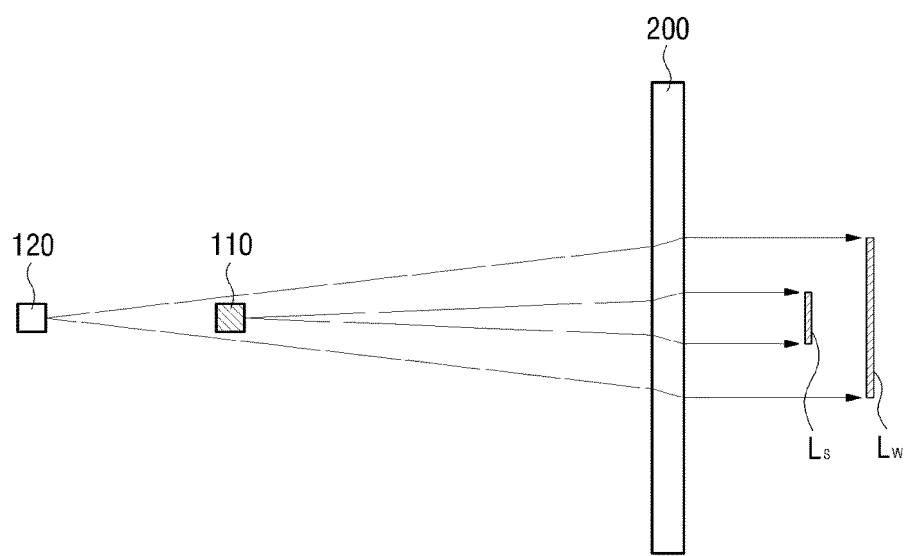
FIG. 9 illustrates an exemplary a change in a light pattern according to a distance between a lenticular lens and a light source according to an exemplary embodiment of the present disclosure.

FIG. 9 illustrates a change in a light pattern based on a distance between a lenticular lens and a light source according to an exemplary embodiment. Referring to FIG. 9, a plurality of light sources 110 and 120 may be provided at different distances from a lenticular lens 200. Since light emitted from each of the light sources 110 and 120 may be diffused and then irradiated, a vertical cross-section of the light may increase as the distance from the lenticular lens 200 increases. As described above, a pattern of light irradiated from a light source may be in the shape of a dot. Therefore, as the distance from the light source increases, the size of the dot-shaped light pattern (hereinafter, referred to as a dot pattern) may increase. The lenticular lens 200 may be configured to form a line-shaped light pattern (hereinafter, referred to as a line pattern) by diffusing incident light in a direction perpendicular to long axes of diffusion lenses. Therefore, as an incident dot pattern becomes greater, a line pattern formed by the lenticular lens 200 may become wider.

In FIG. 9, a line pattern Ls of the light source 110 disposed relatively close to the lenticular lens 200 and a line pattern Lw of the light source 120 disposed relatively far from the lenticular lens 200 are illustrated. As illustrated in the drawing, the line pattern Lw of the light source 120 disposed relatively far from the lenticular lens 200 may be wider than the line pattern Ls of the light source 110 disposed relatively close to the lenticular lens 200. However, the narrow line pattern Ls may be formed by concentration of energy, and the wide line pattern Lw may be formed by dispersion of energy. Therefore, the narrow line pattern Ls may be observed more clearly than the wide line pattern Lw.

Figure 10:
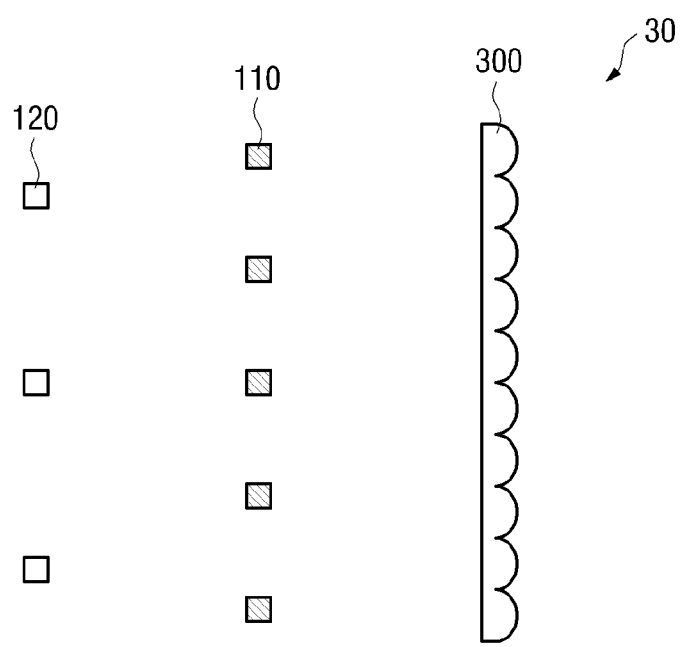
FIGS. 10 and 11 illustrate an exemplary automotive lamp according to an exemplary embodiment of the present disclosure.
Figure 11:
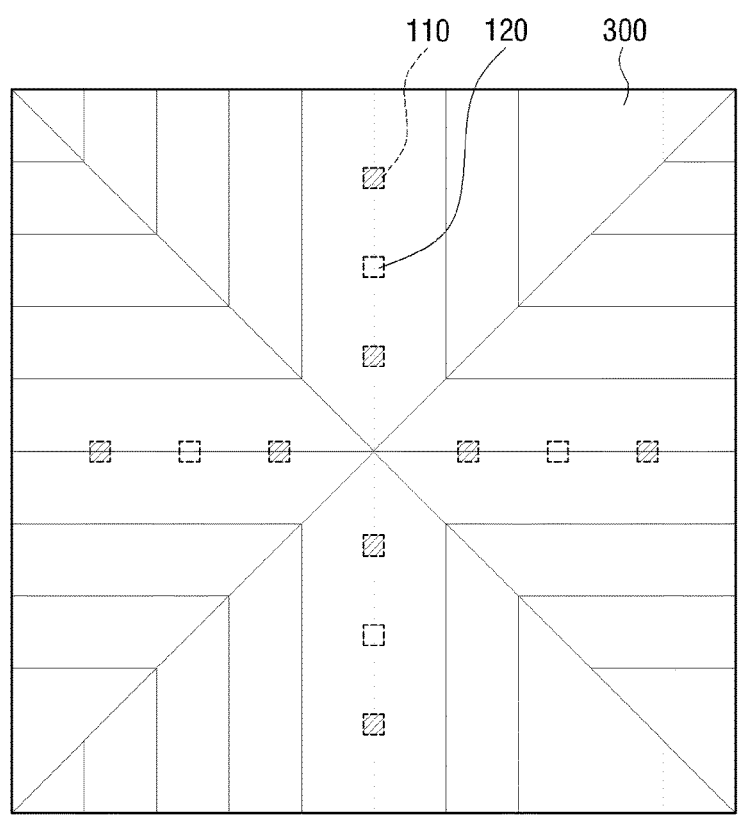

FIGS. 10 and 11 illustrate an automotive lamp 30 according to an exemplary embodiment. Specifically, FIG. 10 may be a side view of the automotive lamp 30, and FIG. 11 may be a front view of the automotive lamp 30. Referring to FIGS. 10 and 11, the automotive lamp 30 may include a light source (100, 120) and an optical component 300.

The light source (110, 120) irradiates light. Since the functions of the light source (110, 120) are identical or similar to those of the above-described light source 100, a detailed description of the functions of the light source (110, 120) will be omitted. However, the automotive lamp 30 according to the current exemplary embodiment may include a plurality of light sources 110 and 120 corresponding to a plurality of lenticular lenses 310 through 340, and a distance between some of the light sources 110 and 120 and the optical component 300 may be different from a distance between the other ones of the light sources 110 and 120 and the optical component 300. In particular, the light sources 110 and 120 may include first light sources 110 disposed relatively close to the optical component 300 and second light sources 120 disposed relatively far from the optical component 300.

The optical component 300 may be configured to form light patterns by transmitting light. The optical component 300 may include a plurality of lenticular lenses 310 through 340, and one or more light sources may be positioned to correspond to each of the lenticular lenses 310 through 340. Since the optical component 300 has been described above, a detailed description of the optical component 300 will be omitted.

Figure 12:
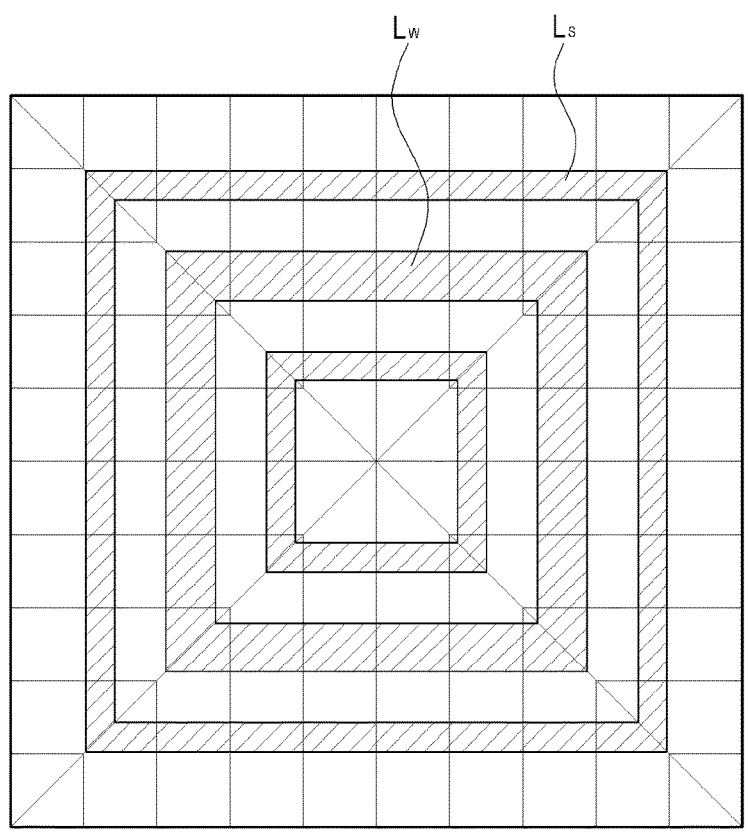
FIG. 12 illustrates exemplary light patterns formed by the automotive lamp of FIGS. 10 and 11.

The light sources 110 and 120 disposed at different distances from the optical component 300 may form line patterns with different widths on a front surface of the optical component 300. FIG. 12 illustrates line patterns Ls and Lw with different widths formed on the front surface of the optical component 300. In FIG. 12, rectangular light patterns are illustrated. However, light patterns of various shapes may be formed based on the shape of the lenticular lenses 310 through 340 that form the optical component 300.

Figure 13:
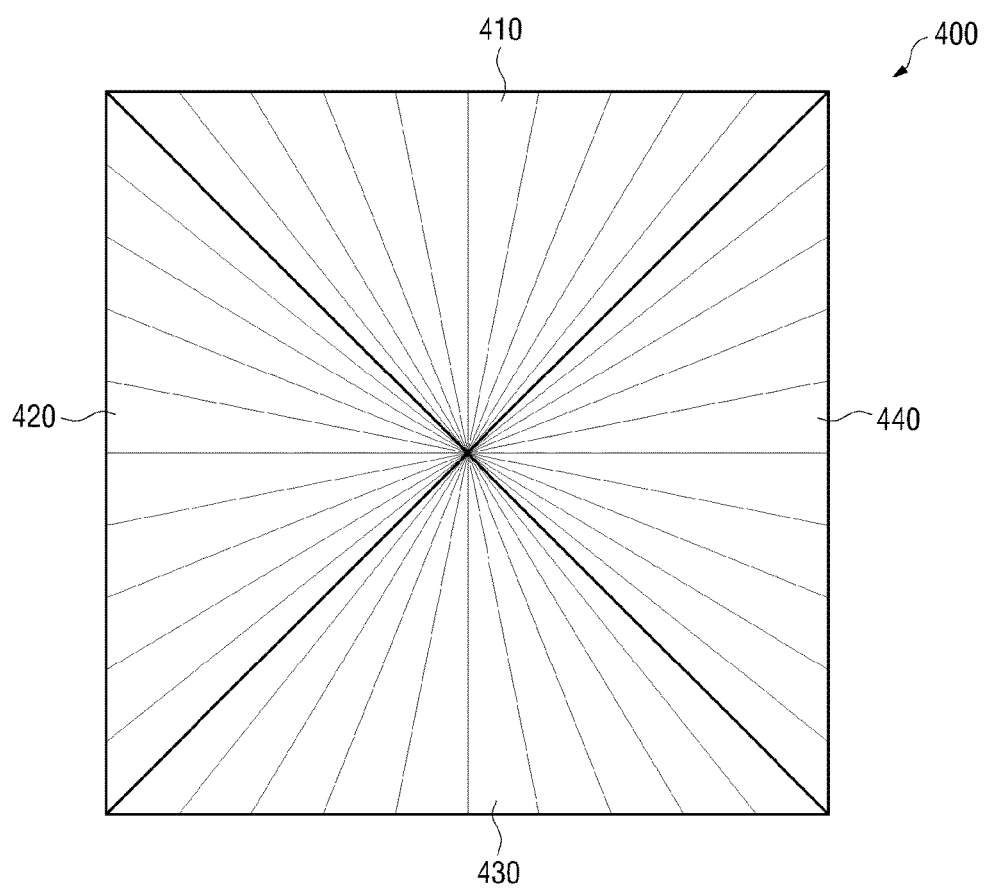
FIG. 13 illustrates an exemplary optical component according to an exemplary embodiment of the present disclosure.
Figure 14:
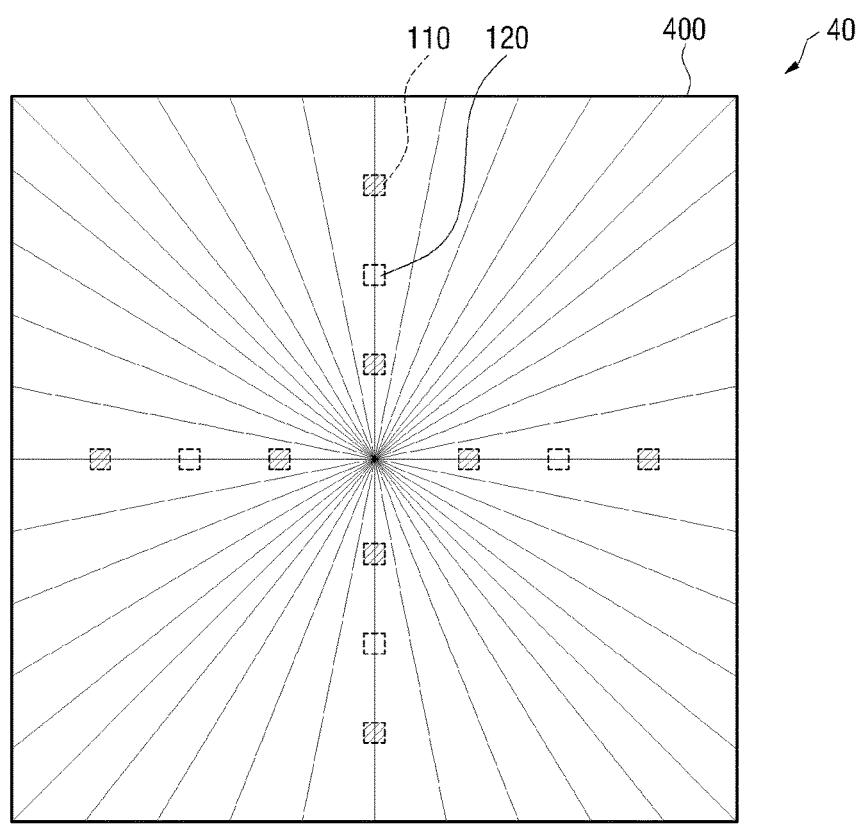
FIG. 14 illustrates an exemplary automotive lamp having light sources disposed on a rear surface of the optical component of FIG. 13.

FIG. 13 illustrates an optical component 400 according to an exemplary embodiment. FIG. 14 illustrates an automotive lamp 40 having light sources 110 and 120 disposed on a rear surface of the optical component 400 of FIG. 13. Referring to FIGS. 13 and 14, the automotive lamp 40 may include the light sources 110 and 120 and the optical component 400. Since the light sources 110 and 120 have been described above, a detailed description of the light sources 110 and 120 will be omitted. Alternatively, one or more light sources disposed at the same distance from the optical component 400 may be provided.

The optical component 400 may include a plurality of lenticular lenses 410 through 440, each including one or more diffusion lenses whose widths change along long axes of the diffusion lenses. The lenticular lenses 410 through 440 may form light patterns in the shape of curves as light irradiated from the light sources 110 and 120 transmits through the lenticular lenses 410 through 440. In particular, as illustrated in FIGS. 13 and 14, the diffusion lenses of each of the lenticular lenses 410 through 440 may be disposed such that narrow ends of the diffusion lenses converge on one location. Since the widths of the diffusion lenses vary along the long axes of the diffusion lenses, light patterns formed respectively by the diffusion lenses are connected to each other, thereby forming curves.

Figure 15:
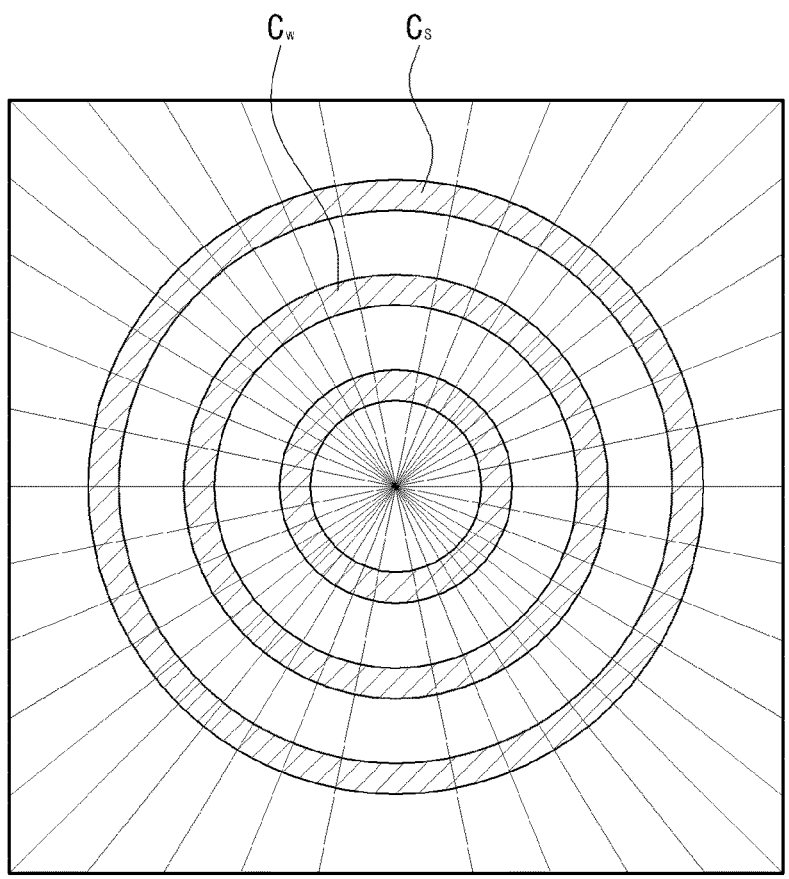
FIGS. 15 and 16 illustrate light patterns formed by the automotive lamp of FIG. 14.
Figure 16:
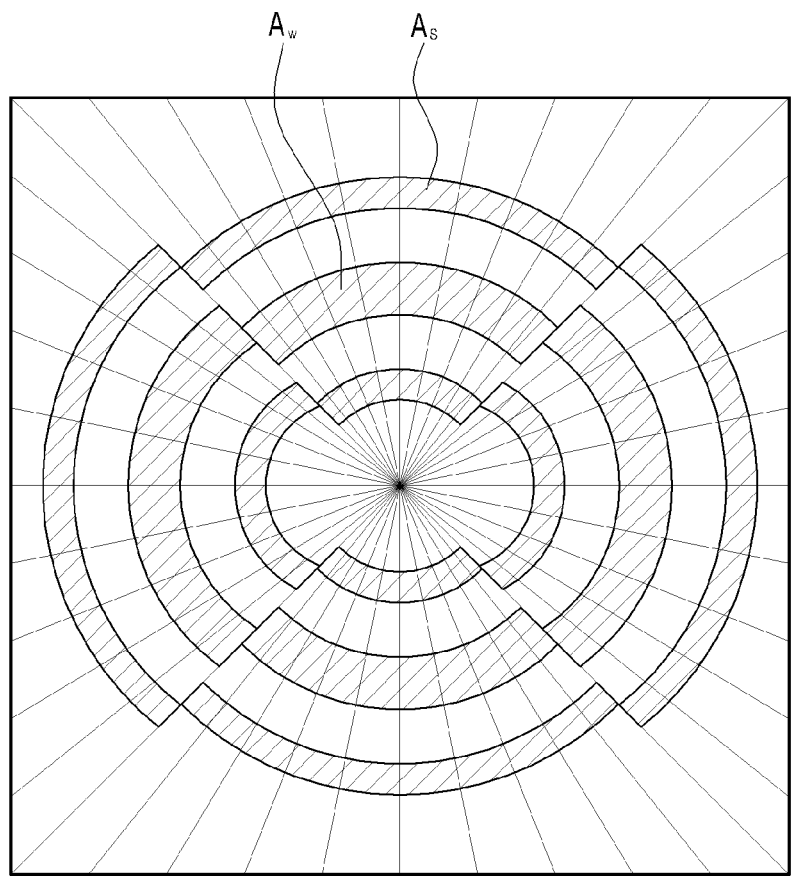

FIGS. 15 and 16 illustrate light patterns formed by the automotive lamp 40 of FIG. 14. Referring to FIGS. 15 and 16, curved light patterns are formed as light transmits through a plurality of diffusion lenses whose widths change along the long axes of the diffusion lenses. A plurality of curves may be connected to each other to form circles Cs and Cw as illustrated in FIG. 15, and a plurality of curves As and Aw may be disconnected from each other to form unusual shapes as illustrated in FIG. 16. Light patterns of various shapes may be formed according to the position of the light sources 110 or 120 disposed on the rear surface of the optical component 400. In addition, wide or narrow line patterns Cs, Cw, As or Aw may be formed based on the position of the light sources 110 or 120.

Figure 17:
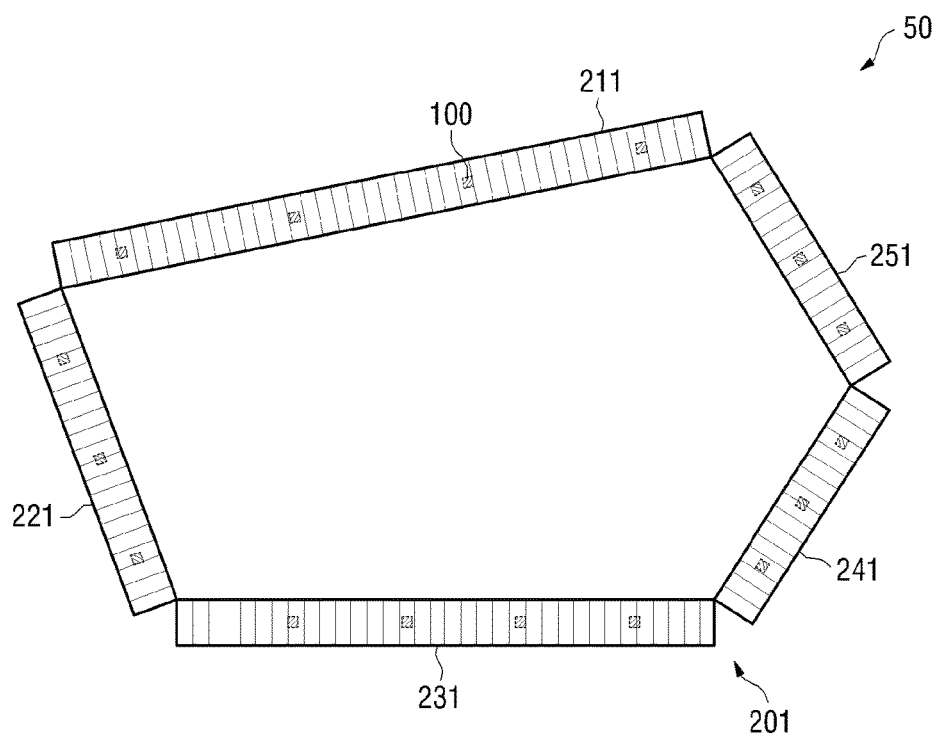
FIG. 17 illustrates an exemplary automotive lamp according to an exemplary embodiment of the present disclosure.

FIG. 17 illustrates an automotive lamp 50 according to an exemplary embodiment. Referring to FIG. 17, the automotive lamp 50 may include a light source 100 and an optical component 201. The light source 100 irradiates light. Since the light source 100 has been described above, a detailed description of the light source 100 will be omitted. However, the automotive lamp 50 according to the current exemplary embodiment may include a plurality of light sources 100 corresponding to a plurality of lenticular lenses 211 through 251 that form the optical component 201.

The optical component 201 may be configured to form a light pattern by transmitting light. The optical component 201 may include a plurality of lenticular lenses 211 through 251 disposed on the same surface. Each of the lenticular lenses 211 through 251 may be shaped like a long bar, and a plurality of diffusion lenses may be arranged along a long axis of each of the lenticular lenses 211 through 251. For example, the long axis of each of the lenticular lenses 211 through 251 may be at a right angle to long axes of the diffusion lenses.

In addition, one or more light sources 100 may be disposed on a rear surface of each of the lenticular lenses 211 through 251. In FIG. 17, the light sources 100 are arranged in a line along the long axis of each of the lenticular lenses 211 through 251. However, the light sources 100 included in the automotive lamp 50 of the inventive concept are not necessarily arranged in a line. Hereinafter, a case where the light sources 100 are arranged in a line along the long axis of each of the lenticular lenses 211 through 251 will be mainly described. Light emitted from the light sources 100 may be irradiated to a corresponding lenticular lens, and the lenticular lens may form a line pattern by transmitting the light.

Figure 18:
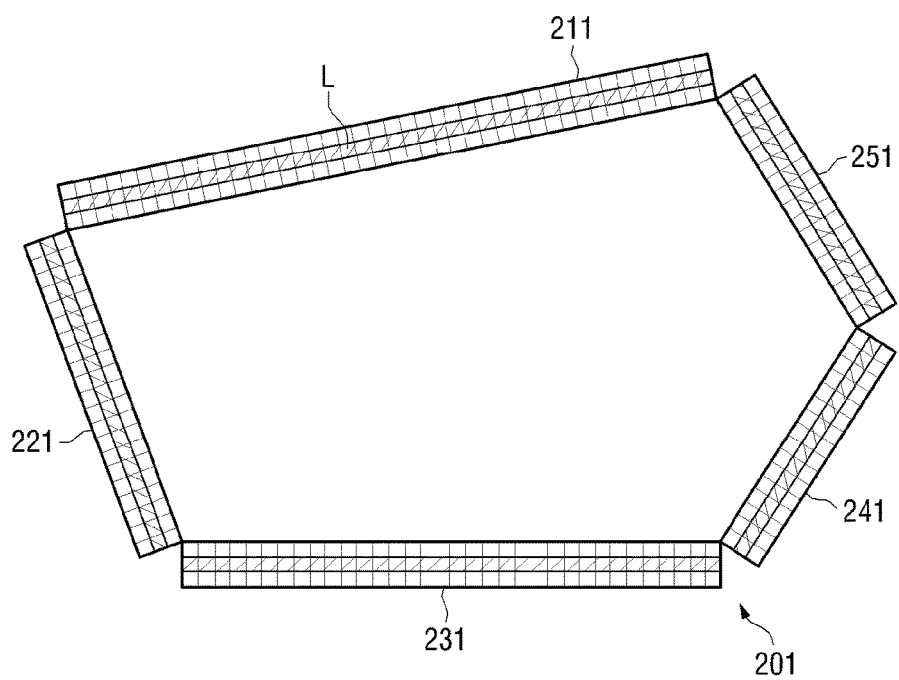
FIG. 18 illustrates an exemplary light pattern formed by the automotive lamp of FIG. 17.

FIG. 18 illustrates a light pattern formed by the automotive lamp 50 of FIG. 17. Referring to FIG. 18, each of the lenticular lenses 211 through 251 may form a light pattern L in the shape of a straight line by transmitting light. In particular, the optical component 201 may form a light pattern corresponding to a shape in which the lenticular lenses 211 through 251 are arranged. A light pattern may be formed in various shapes according to the arrangement of the lenticular lenses 211 through 251. For example, when the lenticular lenses 211 through 251 are arranged in a regular hexagonal shape, a regular pentagonal light pattern may be formed. When the lenticular lenses 211 through 251 are arranged in a star shape, a star-shaped light pattern may be formed. For example, each light pattern may be formed by combining straight line-shaped light patterns. In this way, it may be possible to form a light pattern shaped like a complicated figure by combining straight line-shaped light patterns using only a plurality of lenticular lenses 211 through 251 and a small number of light sources.

Figure 19:
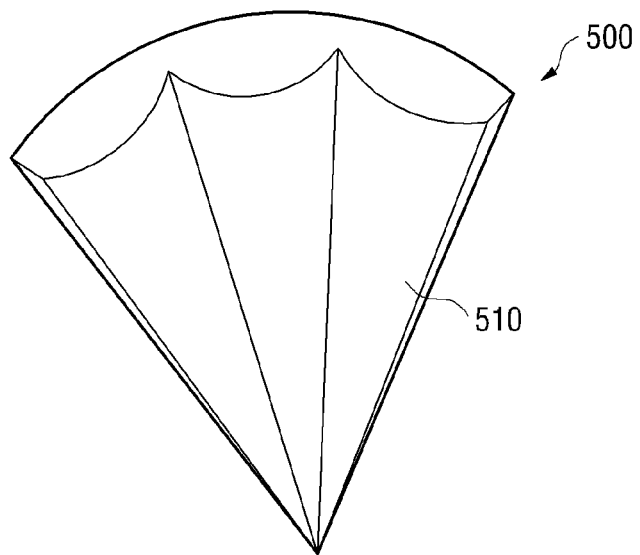
FIG. 19 illustrates an exemplary curved lenticular lens according to an exemplary embodiment of the present disclosure.

FIG. 19 illustrates a curved lenticular lens 500 according to an exemplary embodiment. Referring to FIG. 19, the curved lenticular lens 500 may include one or more diffusion lenses 510 whose widths vary along a long axis of the curved lenticular lens 500. The curved lenticular lens 500 may form a curved light pattern by transmitting light irradiated from a light source.

Figure 20:
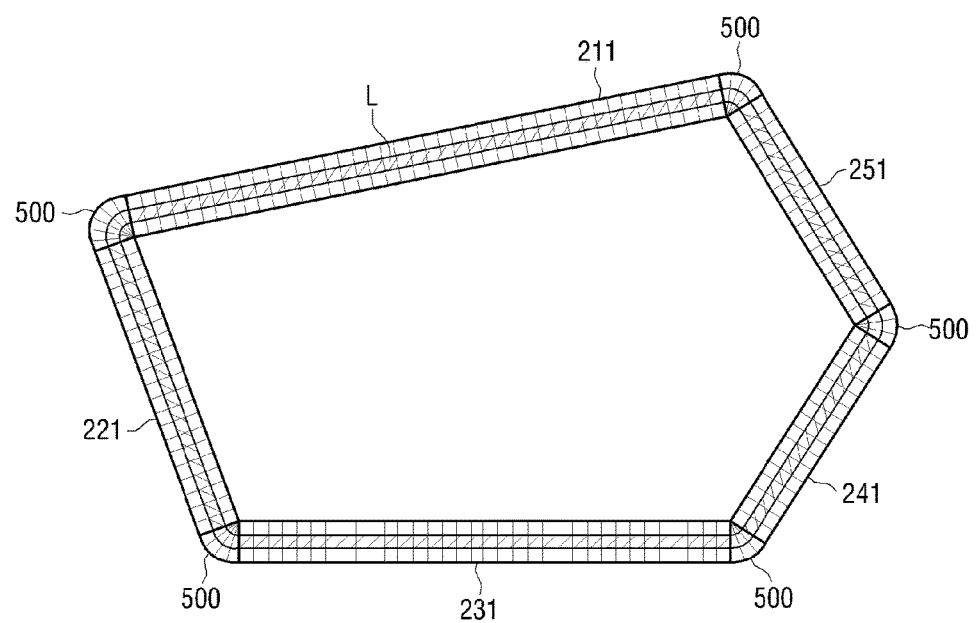
FIG. 20 illustrates an exemplary light pattern formed as a result of adding the lenticular lens of FIG. 19 to the automotive lamp of FIG. 17.

FIG. 20 illustrates a light pattern formed as a result of adding the lenticular lens 500 of FIG. 19 to the automotive lamp 50 of FIG. 17. Referring to FIG. 20, the curved lenticular lens 500 may be disposed between the straight line-shaped lenticular lenses 211 through 251. A curved light pattern formed by the curved lenticular lens 500 may connect ends of straight line-shaped light patterns L formed respectively by each pair of adjacent lenticular lenses 211 through 251. The rate of width change and number of diffusion lenses that form each curved lenticular lens 500 may be determined by the shape of adjacent straight line-shaped lenticular lenses 211 through 251. In addition, a light source (not illustrated) which irradiates light to the curved lenticular lens 500 may be provided for each curved lenticular lens 500. Since the curved lenticular lens 500 may be disposed between each pair of adjacent straight line-shaped lenticular lenses 211 through 251, a light pattern may be formed in a closed shape.

Figure 21:
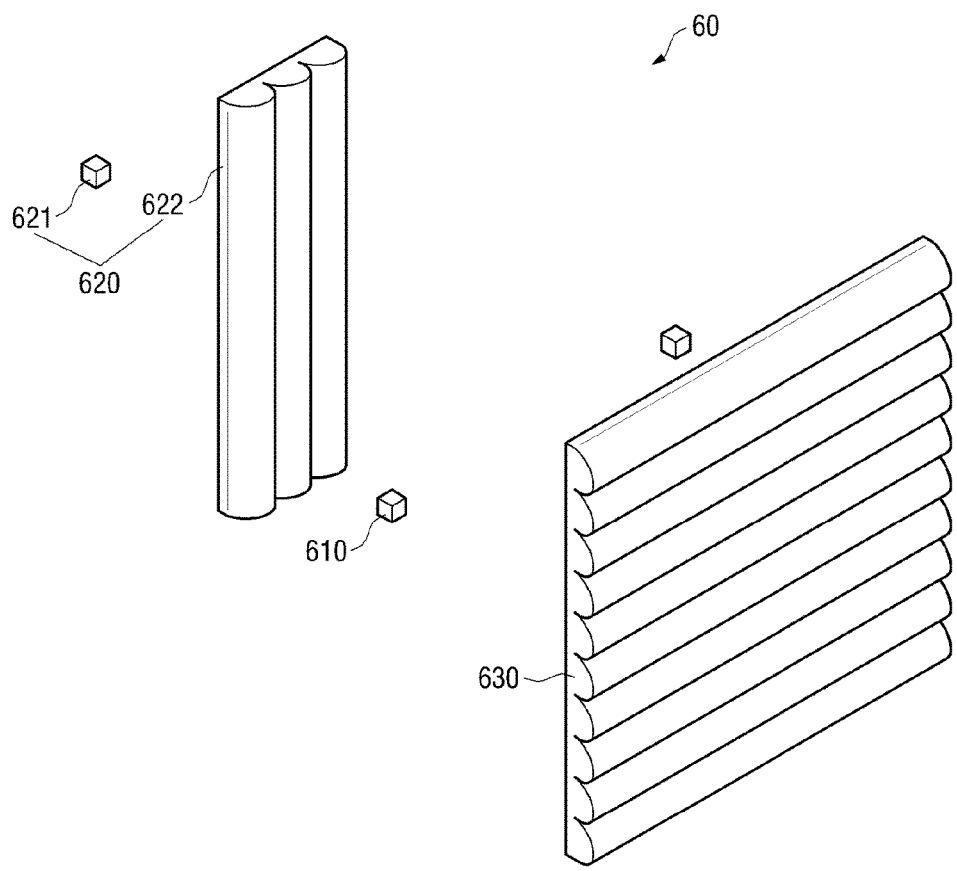
FIGS. 21 through 23 illustrate an exemplary automotive lamp according to an exemplary embodiment.
Figure 22:
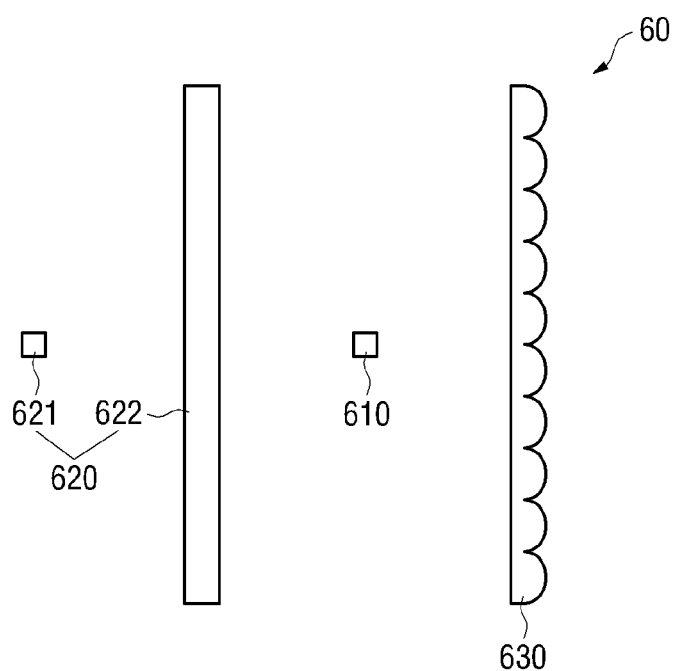
Figure 23:
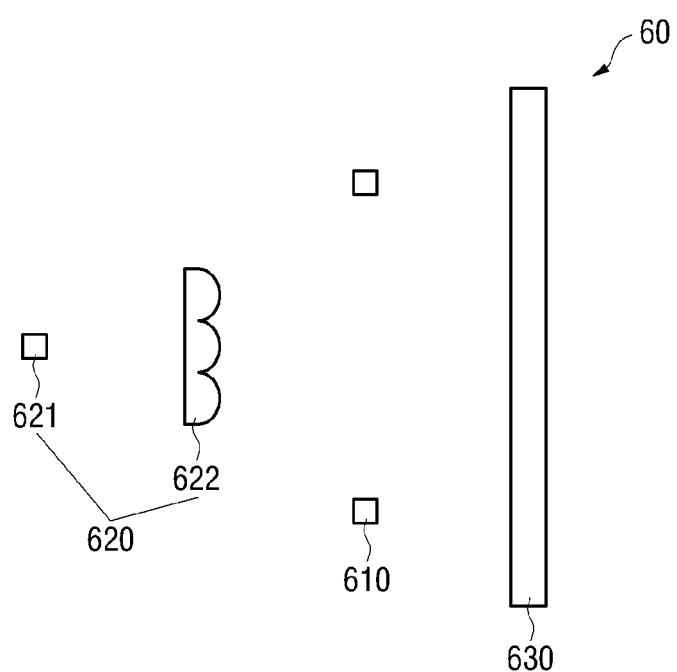

FIGS. 21 through 23 illustrate an automotive lamp 60 according to an exemplary embodiment. Referring to FIGS. 21 through 23, the automotive lamp 60 may include a first light irradiator 610, a second light irradiator 620, and an optical component 630. The first light irradiator 610 irradiates first light in the shape of a dot. The automotive lamp 60 according to the current exemplary embodiment may include at least one first light irradiator 610. The light source 100 described above may function as the first light irradiator 610. Since the light source 100 has been described above, a detailed description of the light source 100 will be omitted.

The second light irradiator 620 irradiates second light in the shape of a line. To this end, the second light irradiator 620 may include a light source 621 which irradiates light in the shape of a dot and a light diffuser 622 which converts light in the shape of a dot into the shape of a line by diffusing the light in the shape of the dot. The light diffuser 622 may be a lenticular lens including one or more diffusion lenses. As light emitted from the light source 621 transmits through the light diffuser 622, a light pattern in the shape of a straight line may be formed.

Figure 24:
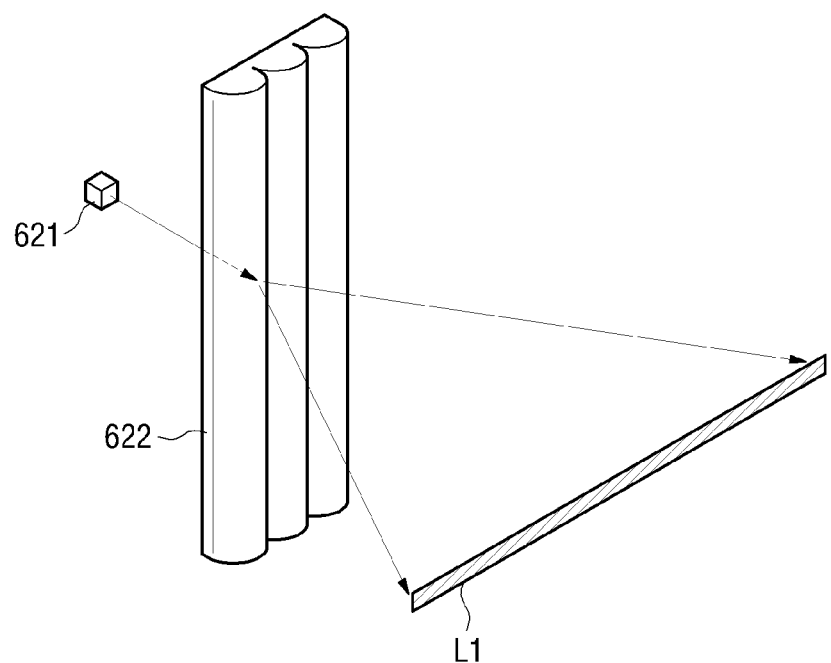
FIG. 24 illustrates an exemplary second light irradiator according to an exemplary embodiment of the present disclosure.

FIG. 24 illustrates a light pattern L1 formed by the second light irradiator 620. Light incident upon the light diffuser 622 may be diffused by the diffusion lenses to produce the light pattern L1 in the shape of a straight line. Referring back to FIGS. 21 through 23, the optical component 630 may form a light pattern by transmitting at least one of the first light and the second light. In particular, the optical component 630 may form a light pattern by transmitting the first light, the second light, or both the first light and the second light.

The optical component 630 may include one or more lenticular lenses. Using the lenticular lenses, the optical component 630 may form a light pattern by transmitting the first light or the second light. In particular, the optical component 630 may form a light pattern in the shape of a straight line by transmitting the first light in the shape of a dot or form a light pattern in the shape of a surface by transmitting the second light in the shape of a straight line. The first light irradiator 610 and the second light irradiator 620 which respectively irradiate the first light and the second light may operate selectively. In particular, the first light irradiator 610 may irradiate the first light, the second light irradiator 620 may irradiate the second light, or both the first light irradiator 610 and the second light irradiator 620 may simultaneously irradiate the first light and the second light.

The automotive lamp 60 according to the exemplary embodiment may be a tail lamp of a vehicle (not illustrated). In particular, the automotive lamp 600 may serve as a tail lamp or a brake lamp. Accordingly, the first light irradiator 610 or the second light irradiator 620 may selectively irradiate the first light or the second light according to a tail lamp operation or a brake lamp operation. For example, the first light irradiator 610 may operate in the case of the tail lamp operation, and the second light irradiator 620 may operate in the case of the brake lamp operation. Conversely, the second light irradiator 620 may operate in the case of the tail lamp operation, and the first light irradiator 610 may operate in the case of the brake lamp operation. A distance between the optical component 630 and the first light irradiator 610 may be shorter than a distance between the optical component 630 and the second light irradiator 620. As the light irradiator 610 or 620 may be closer to the optical component 630, light with higher energy may be incident on the optical component 630.

In the inventive concept, the first light may be used to form a line-shaped light pattern (hereinafter, referred to as a first light pattern), and the second light may be used to form a surface-shaped light pattern (hereinafter, referred to as a second light pattern) formed around the first light pattern. For example, the second light pattern may serve as a background image of the first light pattern. Therefore, the first light pattern may be perceived more clearly, and the second light pattern may be perceived less clearly than the first light pattern.

Since the distance between the optical component 630 and the first light irradiator 610 may be smaller than the distance between the optical component 630 and the second light irradiator 620, the first light pattern may be perceived relatively clearly, and the second light pattern may be perceived relatively unclearly. The optical component 630 and the light diffuser 622 may be disposed such that long axes of the lenticular lenses included in the optical component 630 are at a right angle to long axes of the diffusion lenses included in the light diffuser 622. Accordingly, light emitted from the light diffuser 622 may be uniformly incident on the optical component 630. As a result, the second light pattern shaped like an even surface may be formed. A case where the second light irradiator 620 irradiates the second light in the shape of a line has been described above. According to an exemplary embodiment, however, the second light irradiator 620 may also irradiate the second light in the shape of a surface.

Figure 25:
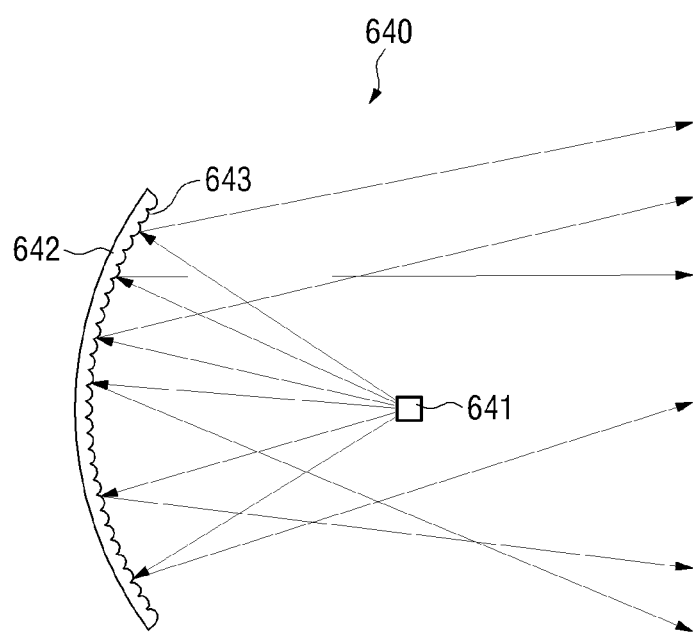
FIG. 25 illustrates an exemplary second light irradiator according to an exemplary embodiment of the present disclosure.
Figure 26:
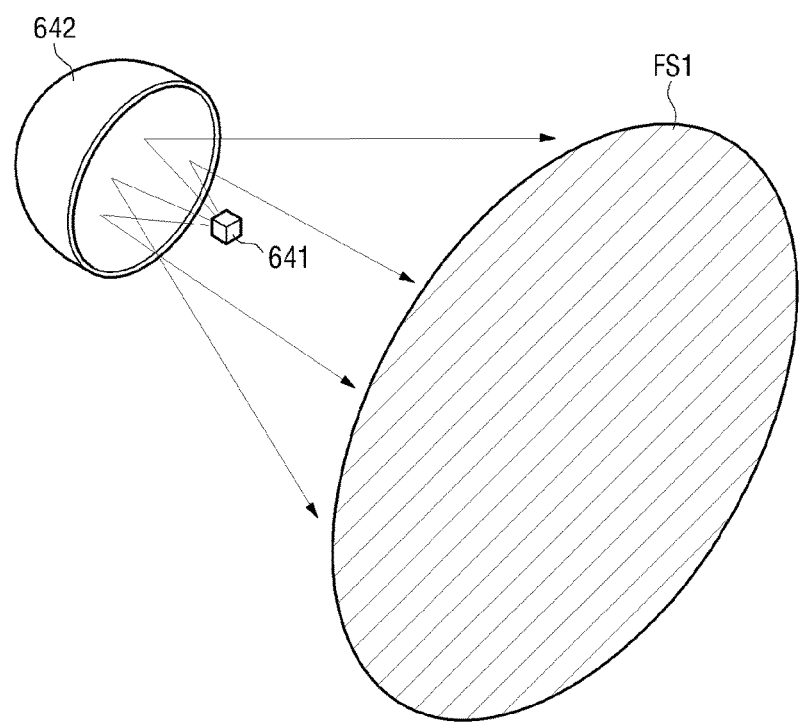
FIG. 26 illustrates an exemplary light irradiated by the second light irradiator of FIG. 25.

FIG. 25 illustrates a second light irradiator 640 according to an exemplary embodiment. Referring to FIG. 25, the second light irradiator 640 may include a light source 641 and a reflector 642. The light source 641 irradiates light. Since the functions of the light source 641 are identical or similar to those of the above-described light source 100, a detailed description of the functions of the light source 641 will be omitted. Light may be irradiated to the reflector 642. The reflector 642 may include a diffused reflection layer 643. Therefore, light irradiated to the reflector 642 may be reflected by the diffused reflection layer 643 to the optical component 630. In particular, since light may be reflected by the diffused reflection layer 643, the second light irradiator 640 may form a light pattern FS1 in the shape of a surface as illustrated in FIG. 26. The surface-shaped light pattern FS1 formed by the second light irradiator 640 may enter the optical component 630, and the optical component 630 may form the second pattern in the shape of a surface by diffusing the incident light.

Figure 27:
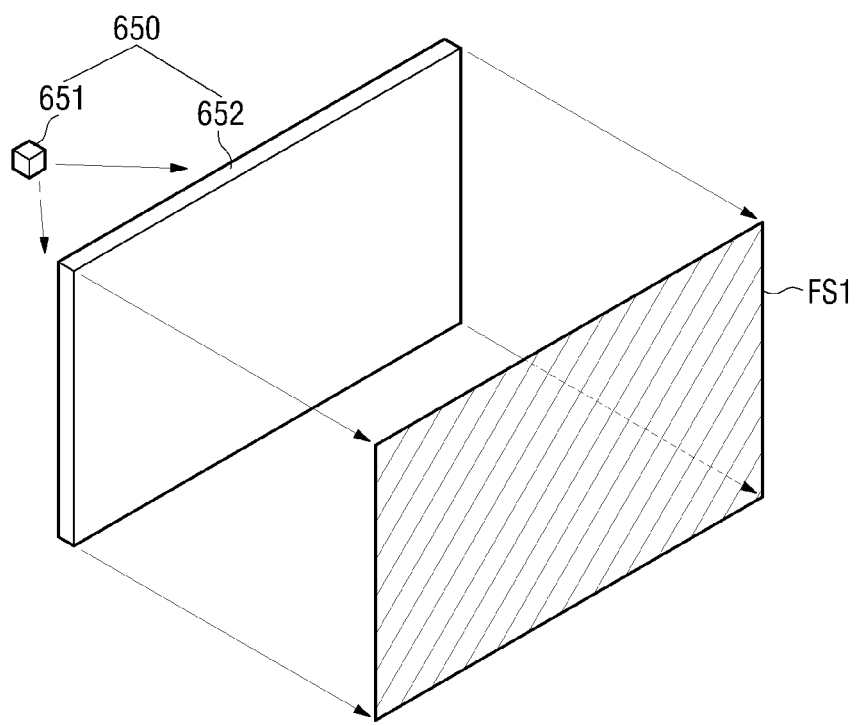
FIG. 27 illustrates an exemplary second light irradiator according to an exemplary embodiment of the present disclosure.

FIG. 27 illustrates a second light irradiator 650 according to an exemplary embodiment. Referring to FIG. 27, the second light irradiator 650 may include a light source 651 and a light guide plate (LGP) 652. The light source 651 irradiates light. Since the functions of the light source 651 are identical or similar to those of the above-described light source 100, a detailed description of the functions of the light source 651 will be omitted. Light irradiated to the LGP 652 may be emitted as surface light. In particular, the LGP 652 may be configured to form a light pattern FS1 in the shape of a surface by diffusing incident light. The surface-shaped light pattern FS1 formed by the second light irradiator 650 may enter the optical component 630, and the optical component 630 may form the second light pattern in the shape of a surface by diffusing the incident light.

Figure 28:
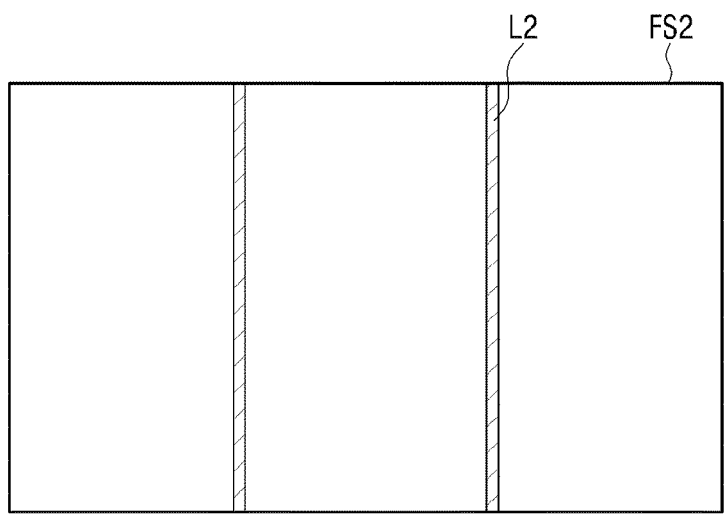
FIG. 28 illustrates an exemplary light patterns formed by the automotive lamp of FIGS. 21 through 27.

FIG. 28 illustrates light patterns formed by the automotive lamp 60 of FIGS. 21 through 27. Referring to FIG. 28, the light patterns may include a first light pattern L2 and a second light pattern FS2. The first light pattern L2 may be perceived relatively clearly, and the second light pattern FS2 may be perceived relatively unclearly. Therefore, the second light pattern FS2 may serve as a background image of the first light pattern L2.

The first light pattern L2 and the second light pattern FS2 may serve as a tail lamp and a brake lamp, respectively. For example, when a control signal for turning the tail lamp on may be generated in a vehicle, the first light pattern L2 may be formed. When a control signal for turning the brake lamp on may be generated in the vehicle, the second light pattern FS2 may be formed. Conversely, when the control signal for turning the tail lamp on may be generated in the vehicle, the second light pattern FS2 may be formed. When the control signal for turning the brake lamp on may be generated in the vehicle, the first light pattern L2 may be formed.

Figure 29:
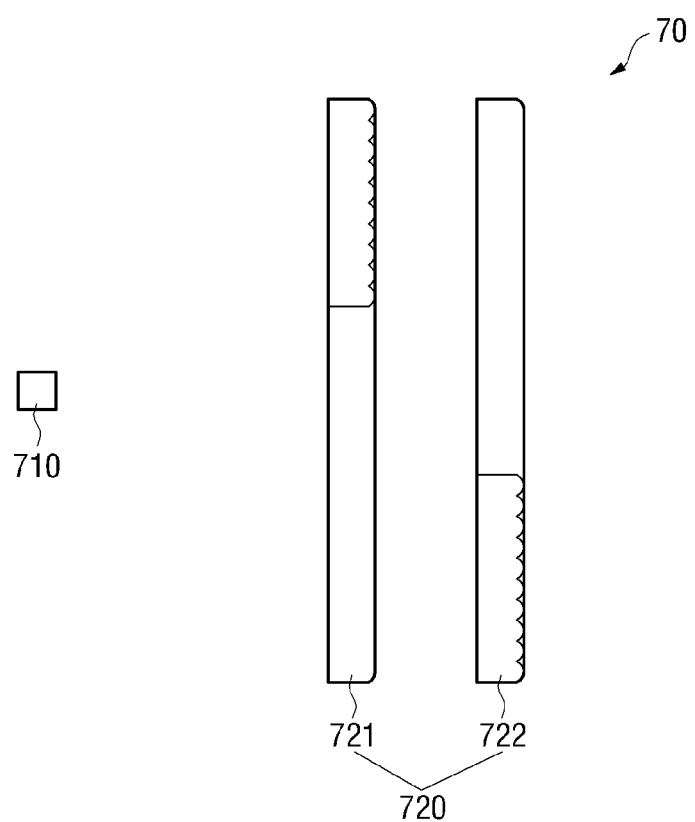
FIG. 29 illustrates an exemplary automotive lamp according to an exemplary embodiment of the present disclosure.

FIG. 29 illustrates an automotive lamp 70 according to an exemplary embodiment. Referring to FIG. 29, the automotive lamp 70 may include a light source 710 and an optical component 720. The light source 710 irradiates light. At least one light source 710 may be provided. When a plurality of light sources 710 are provided, they may be disposed at equal or different distances from a first lenticular lens 721. Since the functions of the light source 710 are identical or similar to those of the above-described light source 100, a detailed description of the functions of the light source 710 will be omitted. The optical component 720 may be configured to form a light pattern by transmitting light emitted from the light source 710. To this end, the optical component 720 may include the first lenticular lens 721 and a second lenticular lens 722.

The first lenticular lens 721 transmits light emitted from the light source 710, and the second lenticular lens 722 transmits light output from the first lenticular lens 721. A dot-shaped light pattern formed by the light source 710 may be converted into a line-shaped light pattern as it transmits through the first lenticular lens 721. In addition, the line-shaped light pattern may be converted into a surface-shaped light pattern as it transmits through the second lenticular lens 722. To form the surface-shaped light pattern, the first lenticular lens 721 and the second lenticular lens 722 may be disposed such that long axes of diffusion lenses included in one of the first lenticular lens 721 and the second lenticular lens 722 are not parallel to long axes of diffusion lenses included in the other one of the first lenticular lens 721 and the second lenticular lens 722.

Figure 30:
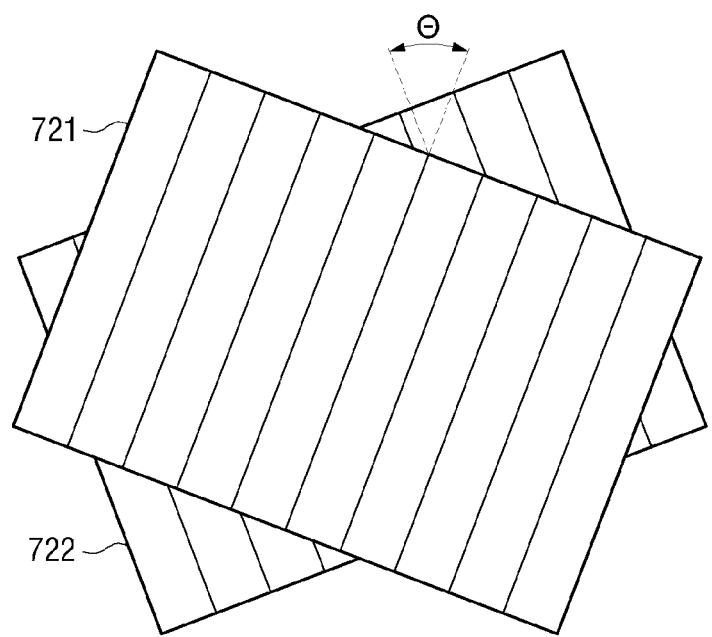
FIG. 30 illustrates an exemplary positional relationship between a first lenticular lens and a second lenticular lens according to an exemplary embodiment.

FIG. 30 illustrates the positional relationship between the first lenticular lens 721 and the second lenticular lens 722 according to an exemplary embodiment. Referring to FIG. 30, the first lenticular lens 721 and the second lenticular lens 722 may be disposed such that the diffusion lenses included in one of the first lenticular lens 721 and the second lenticular lens 722 form a preset angle with the diffusion lenses included in the other one of the first lenticular lens 721 and the second lenticular lens 722.

For example, the preset angle may be, but is not limited to, between about 10 and about 80 degrees. When the angle formed between the diffusion lenses included in the first lenticular lens 721 and the second lenticular lens 722 may be about 0 degrees, light that transmits through the second lenticular lens 722 may form a line-shaped light pattern instead of a surface-shaped light pattern. In addition, when the angle formed between the diffusion lenses included in the first lenticular lens 721 and the second lenticular lens 722 may be 90 degrees, light that transmits through the second lenticular lens 722 may form a rectangular light pattern.

When the angle between the diffusion lenses included in the first lenticular lens 721 and the second lenticular lens 722 may be between about 0 and about 90 degrees, a light pattern having an unusual shape may be formed. In particular, when the angle may be between about 10 and 80 degrees, the shape of a light pattern may be clear. The shape of the light pattern and may vary according to the angle.

Figure 31:
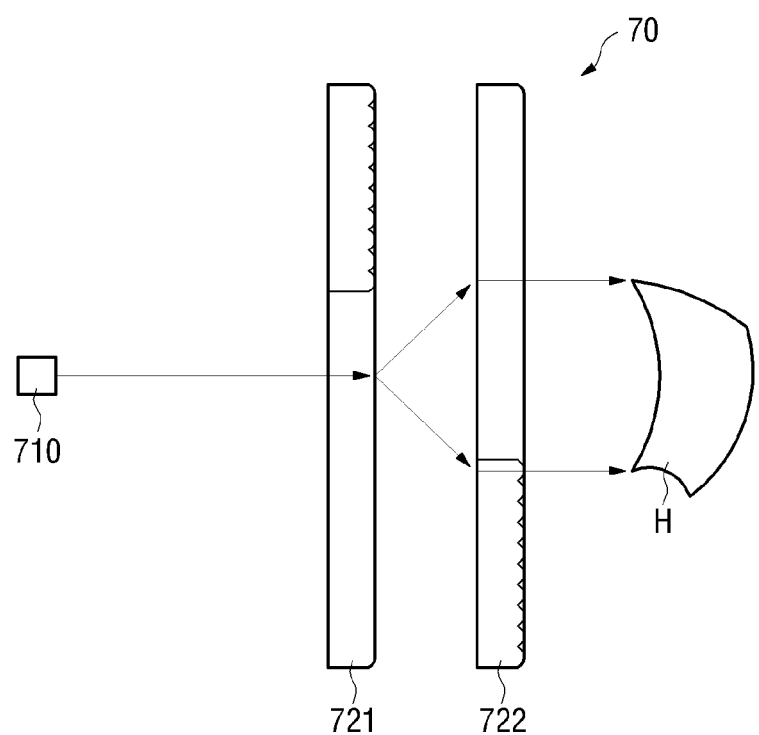
FIGS. 31 and 32 illustrate an exemplary formation of a light pattern by the automotive lamp of FIGS. 29 and 30.
Figure 32:
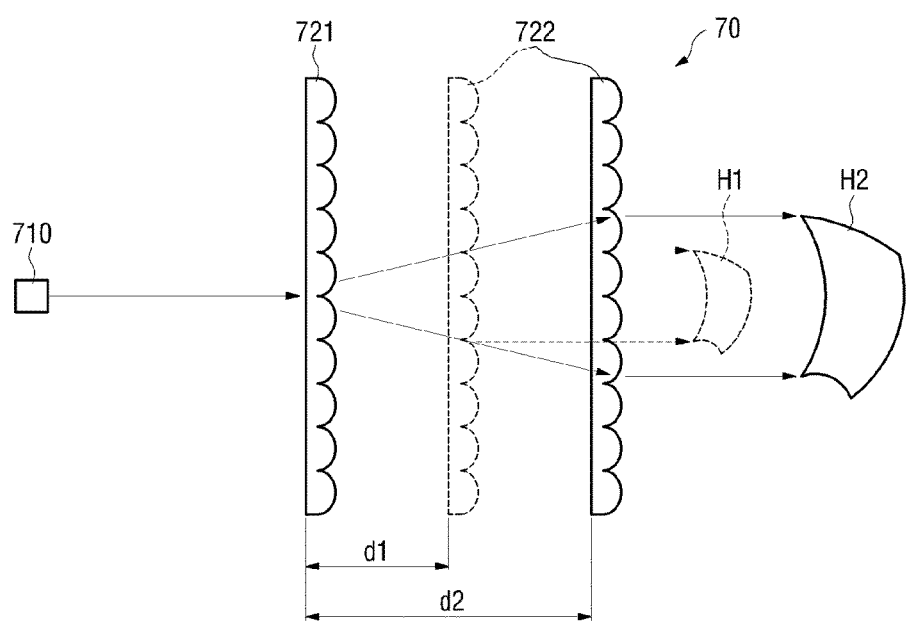

FIGS. 31 and 32 illustrate the formation of a light pattern by the automotive lamp 70 of FIGS. 29 and 30. Referring to FIG. 31, the automotive lamp 70 may form a light pattern H. As light emitted from the light source 710 transmits through the first lenticular lens 721, a light pattern having a line shape may be formed. In addition, as the line-shaped light pattern transmits through the second lenticular lens 722, the light pattern H having an unusual shape may be formed. As described above, the shape of the light pattern H may vary according to the angle formed between the diffusion lenses included in the first lenticular lens 721 and the second lenticular lens 722.

The first lenticular lens 721 and the second lenticular lens 722 may be separated from each other by a preset distance. For example, the preset distance may be, but is not limited to, between 0 and 60 mm.

Referring to FIG. 32, the size of the light pattern H1 or H2 may vary according to the distance d1 or d2 between the first lenticular lens 721 and the second lenticular lens 722. In particular, a shorter distance between the first lenticular lens 721 and the second lenticular lens 722 may result in a smaller light pattern H1, and a longer distance between the first lenticular lens 721 and the second lenticular lens 722 may result in a larger light pattern H2.

When the distance between the first lenticular lens 721 and the second lenticular lens 722 may be small, a light pattern may be formed by concentration of more energy. Therefore, the light pattern H1 has a relatively clear shape. On the other hand, when the distance between the first lenticular lens 721 and the second lenticular lens 722 may be great, a light pattern may be formed by dispersion of energy. Therefore, the light pattern H2 has a relatively unclear shape.

Figure 33:
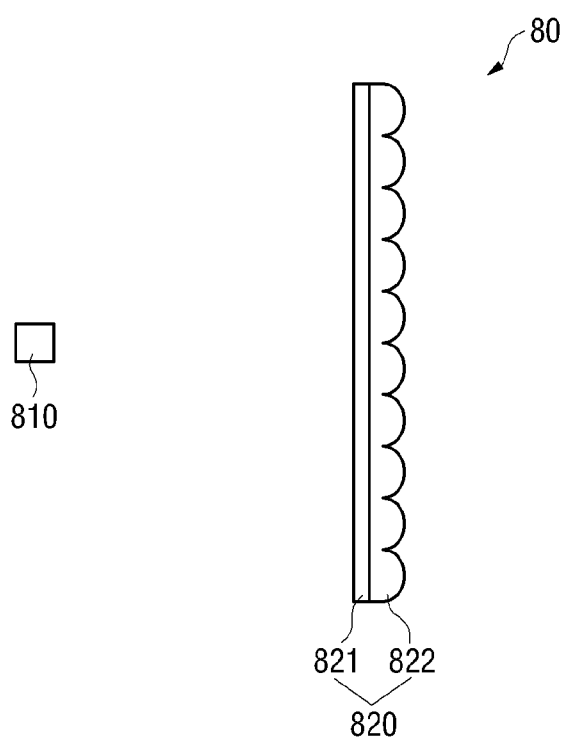
FIG. 33 illustrates an exemplary automotive lamp according to an exemplary embodiment of the present disclosure.

FIG. 33 illustrates an automotive lamp 80 according to an exemplary embodiment. Referring to FIG. 33, the automotive lamp 80 may include a light source 810 and a light pattern forming component 820. The light source 810 irradiates light. At least one light source 810 may be provided. Since the functions of the light source 810 are identical or similar to those of the above-described light source 100, a detailed description of the functions of the light source 810 will be omitted. The light pattern forming component 820 may be configured to form a plurality of light patterns by transmitting light emitted from the light source 810. In particular, the light pattern forming component 820 may enable a light pattern of a different image to be observed according to a viewing angle. As the viewing angle may be changed sequentially in a particular direction, light patterns of different images may provide a continuous moving shape.

The light pattern forming component 820 may include an image layer 821 and a lenticular lens 822. The image layer 821 may include a plurality of different images. As light patterns of the images change sequentially, an observer may perceive a continuous moving shape. The lenticular lens 822 may be configured to form a light pattern of a specific image at a specific viewing angle by diffusing light that transmits through the image layer 821.

Figure 34:
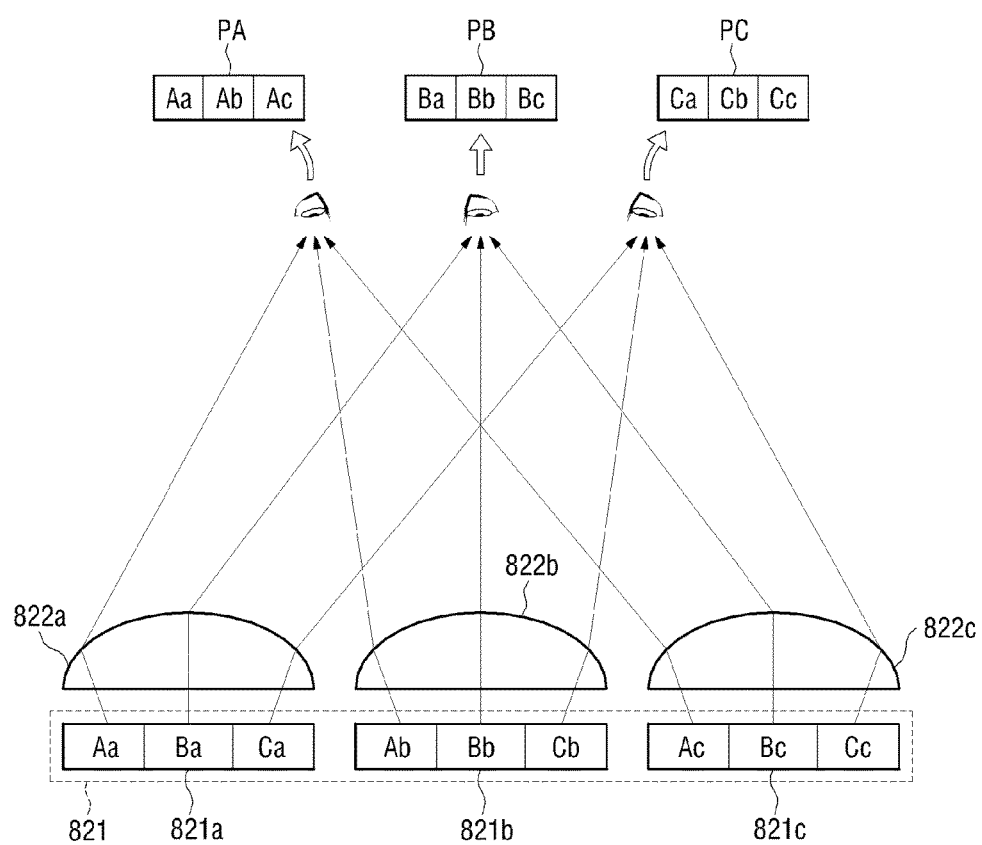
FIG. 34 illustrates an exemplary principle that a light pattern of a different image is perceived according to an angle at which the automotive lamp of FIG. 33 is viewed.

FIG. 34 illustrates the principle that a light pattern of a different image may be perceived based on an angle at which the automotive lamp 80 of FIG. 33 is viewed. Referring to FIG. 34, an image segment group 821*a*, 821*b* or 821*c* may be positioned to correspond to each diffusion lens 822*a*, 822*b* or 822*c* of the lenticular lens 822. Each of the different images described above may be split into a plurality of image segments. For example, an A image may be split into Aa, Ab and Ac, a B image may be split into Ba, Bb and Bc, and a C image may be split into Ca, Cb and Cc. The Aa, Ab, Ac, Ba, Bb, Bc, Ca, Cb and Cc image segments may be included in the image layer 821 such that they are positioned to correspond to the different diffusion lenses 822*a* through 822*c* of the lenticular lenses 822. In particular, the Aa, Ba and Ca image segments may form the group 821*a* corresponding to one diffusion lens 822*a* the Ab, Bb and Cb image segments may form the group 821*b* corresponding to one diffusion lens 822*b*, and the Ac, Bc and Cc image segments may form the group 821*c* corresponding to one diffusion lens 822*c*.

The image layer 821 may be include a combination of the image segment groups 821*a* through 821*c* and disposed on a rear surface of the lenticular lens 822. The image segment groups 821*a* through 821*c* may be printed on the rear surface of the lenticular lens 822, or the image layer 821 may be created in the form of an image film and attached to the rear surface of the lenticular lens 822.

The diffusion lenses 822*a* through 822*c* may output incident light by refracting the incident light. For example, an angle at which light output from each of the diffusion lenses 822*a* through 822*c* may be irradiated may vary based on a location on a rear surface of the diffusion lens 822*a*, 822*b* or 822*c* upon which the light may be incident. Accordingly, an image segment perceived by an observer may vary based on a direction in which the observer views each of the diffusion lenses 822*a* through 822*c*. For example, when viewing the diffusion lens 822*a* having the group 821*a* of the Aa, Ba and Ca image segments disposed on the rear surface, the observer may perceive a light pattern of the Aa, Ba or Ca image segment based on the direction in which the observer views the diffusion lens 822*a*.

Light patterns of image segments perceived based on the viewing direction may be applied to all diffusion lenses. Therefore, light patterns of the Aa, Ab and Ac image segments may be perceived simultaneously by the observer at a certain location, light patterns of the Ba, Bb and Bc image segments may be perceived simultaneously by the observer at another location, and light patterns of the Ca, Cb and Cc image segments may be perceived simultaneously by the observer at another location.

For example, the light patterns of the Aa, Ab and Ac image segments may be collectively perceived as a light pattern of the Aa, Ab and Ac image segments connected to each other. In particular, a light pattern PA of the A image may be perceived by the observer. Likewise, the observer may perceive a light pattern PB of the B image or a light pattern PC of the C image depending on the viewing direction. The A, B and C images may provide a continuous moving shape. In particular, the observer may perceive a continuous moving shape by sequentially observing the light patterns PA, PB and PC of the A, B and C images.

Figure 35:
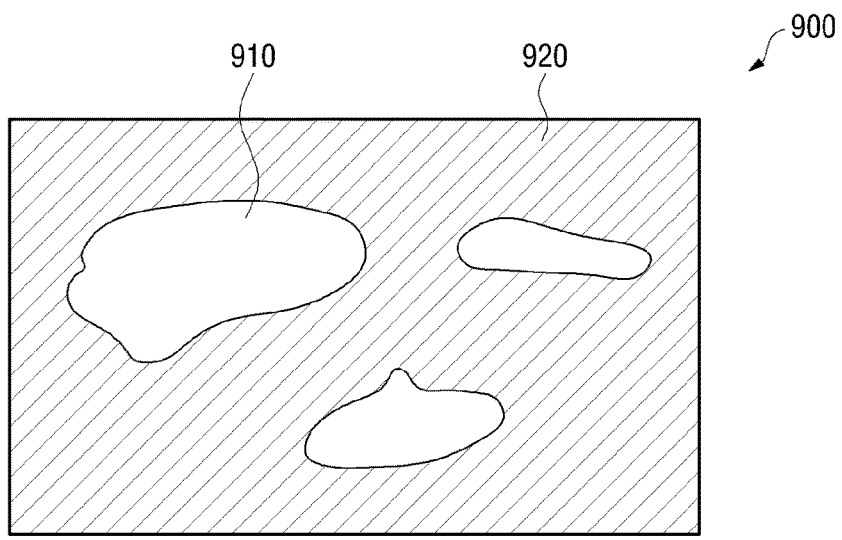
FIG. 35 illustrates an exemplary image according to an exemplary embodiment of the present disclosure.

In FIG. 34, the light patterns PA through PC of three images are perceived sequentially. However, the number of images perceived sequentially may vary according to various exemplary embodiments. FIG. 35 illustrates an image according to an exemplary embodiment. In the inventive concept, each of different images included in the image layer 821 may determine a transmission pattern of light. In particular, each image may transmit light through a distinctive shape.

Specifically, each different image 900 may include a high luminosity region 910 and a low luminosity region 920 according to a transmission pattern of light. The high luminosity region 910 may be a region which transmits a relatively large portion of light emitted from a light source, and the low luminosity region 920 may be a region which transmits a relatively small portion of the light emitted from the light source. The high luminosity region 910 and the low luminosity region 920 may be determined according to the thickness of the image layer 821, whether the image layer 821 may be coated with paint for forming the images, and the degree to which the image layer 821 may be coated with the paint.

A certain region of the image layer 821 may be formed to have greater thickness, and the other region may be formed to have a reduced thickness. Since the thick region has lower light transmittance than the thin region, the thin region may be the high luminosity region 910, and the thick region may be the low luminosity region 920. In addition, a region of the image layer 821 which may be coated with the paint may be the low luminosity region 920, and a region of the image layer 821 which may be not coated with the paint may be the high luminosity region 910. Also, a region of the image layer 821 which is coated relatively thick with the paint may be the low luminosity region 920, and a region of the image layer 821 which is coated relatively thin with the paint may be the high luminosity region 910.

The image 900 may be determined based on the arrangement and light transmittances of the high luminosity region 910 and the low luminosity region 920. A case where the image 900 consists of the high luminosity region 910 and the low luminosity region 920 has been described above. However, an intermediate luminosity region which provides light transmittance between the light transmittance of the high luminosity region 910 and the light transmittance of the low luminosity region 920 may also be included in the image 900. For example, sequential images in which the high luminosity region 910 changes to the low luminosity region 920 may be provided. For example, the high luminosity region 910 may change to the low luminosity region 920 via the intermediate luminosity region. Therefore, while the high luminosity region 910 and the low luminosity region 920 will mainly be described below, it should be noted that the image 900 of the inventive concept may be not composed only of the high luminosity region 910 and the low luminosity region 920.

Figure 36:
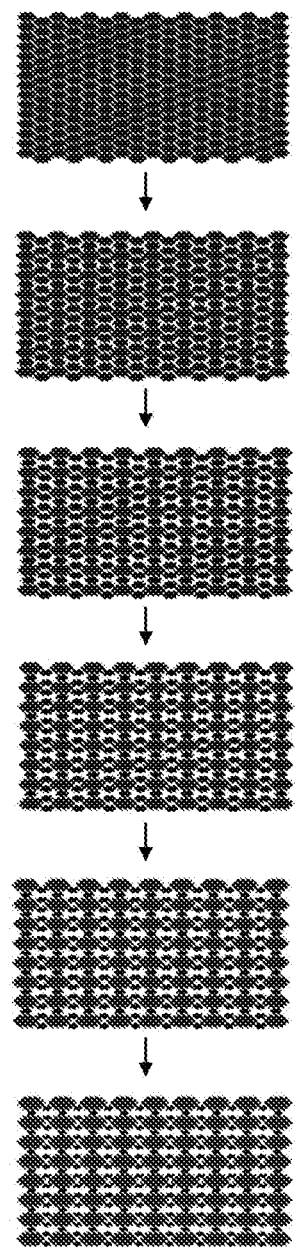
FIGS. 36 through 39 illustrate exemplary image groups which provide moving shapes according to an exemplary embodiment of the present disclosure.

FIGS. 36 through 39 illustrate image groups which provide moving shapes according to an exemplary embodiment. Referring to FIG. 36, different images which form an image layer may provide a continuous moving shape through a sequential change in the size of each of a high luminosity region and a low luminosity region. In an initial image, low luminosity regions may be disposed adjacent to with each other. In subsequent images, some of the low luminosity regions may gradually become greater, whereas the other ones of the low luminosity regions gradually become smaller. In addition, as some of the low luminosity regions become smaller, high luminosity regions around the shrinking low luminosity regions gradually become greater. As an angle at which an observer views an automotive lamp changes sequentially, the observer may perceive a continuous moving shape in which some of low luminosity regions gradually become greater, the other ones of the low luminosity regions gradually become smaller, and high luminosity regions around the shrinking low luminosity regions gradually become greater.

Figure 37:
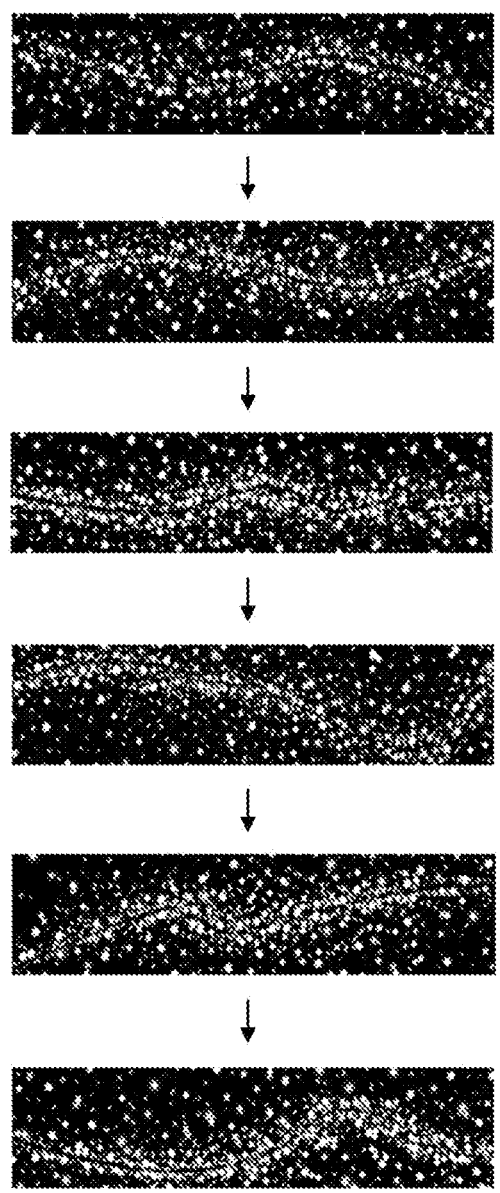

Referring to FIG. 37, different images which form an image layer may provide a continuous moving shape through a random change in at least one of the area and location of each of a high luminosity region and a low luminosity region. An initial image may be mostly a low luminosity region and may include a plurality of high luminosity regions in the shape of dots. The dots may have the same or different sizes and the same or different light transmittances. In addition, the dots may form a particular shape by forming a group. The low luminosity region may not transmit light at all or may transmit light very little. Overall, the low luminosity region may form the background of an image, and the high luminosity regions may form the foreground of the image.

In subsequent images, at least one of the area and location of each high luminosity region may change randomly. For example, the area of a particular high luminosity region may be reduced, or a high luminosity region disposed at a certain location in the low luminosity region may move to another location in the low luminosity region. In addition, as described above, the high luminosity regions may form a particular shape by forming a group. In the subsequent images, the shape of the group may change sequentially. As an angle at which an observer views an automotive lamp changes sequentially, the observer may perceive a moving shape in which the sizes or locations of white dots gradually change against a dark background. For example, the observer may perceive a moving shape to have incremental illumination (e.g., like twinkling stars in the night sky).

In FIG. 37, the low luminosity region may be configured to form the background of the image, and the high luminosity regions form the foreground of the image. However, a high luminosity region may also form the background of the image, and low luminosity regions may also form the foreground of the image.

Figure 38:
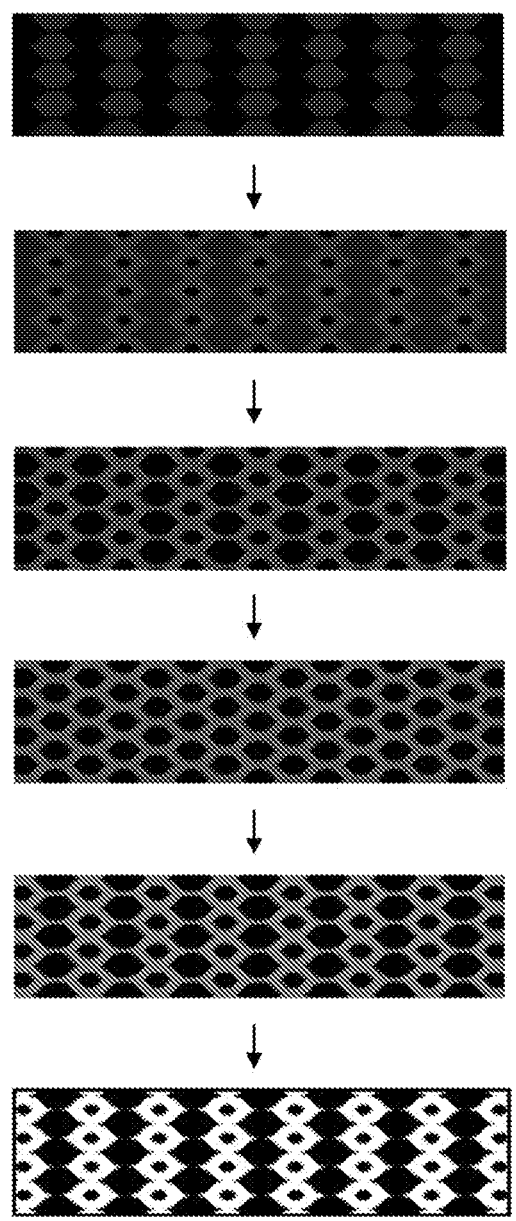

Referring to FIG. 38, different layers which form an image layer may provide a continuous moving shape as a high luminosity region gradually changes to a low luminosity region or as the low luminosity region gradually changes to the high luminosity region. An initial image may be mostly a low luminosity region (hereinafter, referred to as a first low luminosity region) and may include a plurality of other low luminosity regions (hereinafter, referred to as second low luminosity regions). The second low luminosity regions may be arranged in a specific pattern on the first low luminosity region. For example, the second low luminosity regions may be arranged in a grid pattern on the first low luminosity region. For example, the second low luminosity regions may have higher light transmittance than the first low luminosity region.

In subsequent images, the second low luminosity regions may gradually become greater, and the first low luminosity region may be created within each of the second low luminosity regions and become gradually greater. In addition, the second low luminosity regions may gradually change to high luminosity regions. As an angle which an observer views an automotive lamp changes sequentially, the observer may perceive a moving shape in which low luminosity regions change to high luminosity regions.

In FIG. 38, the initial image may include the first and second low luminosity regions. However, the initial image may also include first and second high luminosity regions. In this case, the second high luminosity regions may have lower light transmittance than the first high luminosity region. Therefore, in the subsequent images, the second high luminosity regions may gradually become greater, the first high luminosity region may be created within each of the second high luminosity regions and gradually become greater, and the second high luminosity regions may gradually change to low luminosity regions.

Figure 39:
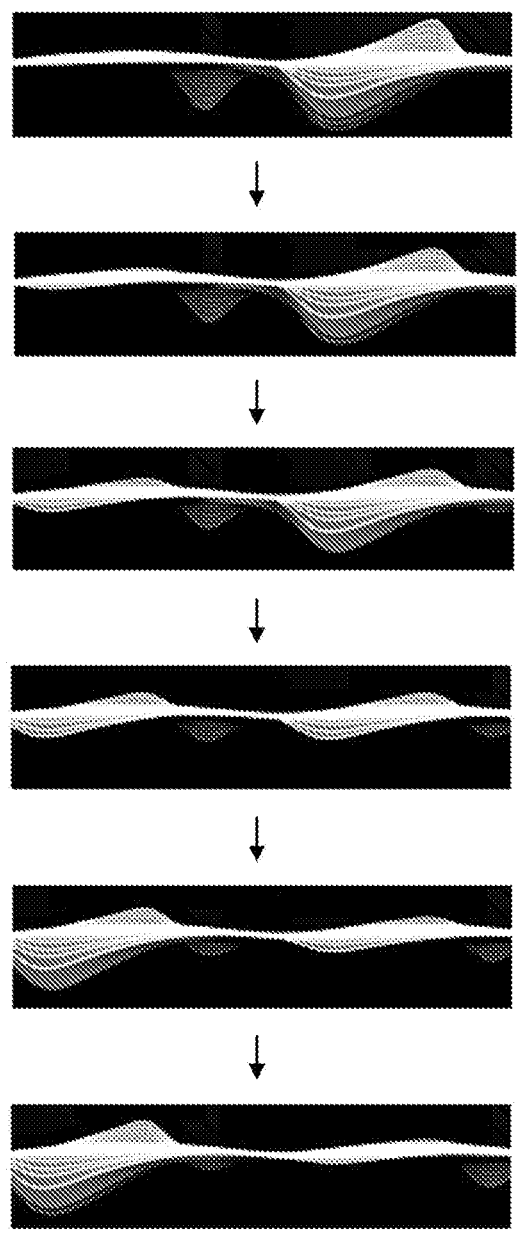

Referring to FIG. 39, different images which form an image layer may provide a continuous motion through a sequential change in at least one of the area and location of each of a high luminosity region and a low luminosity region. An initial image may be mostly a low luminosity region and may include a plurality of high luminosity regions in the shape of lines. The lines may have the same or different thicknesses and the same or different light transmittances.

In subsequent images, the shape of each line may change sequentially. For example, a straight line may change to a curve, or the thickness of a line may change. Alternatively, the light transmittance of a line may be adjusted. The low luminosity region may not transmit light at all or may transmit light very little. On the whole, the low luminosity region may form the background of an image, and the high luminosity regions may form the foreground of the image. The high luminosity regions may form a particular shape by forming a group. In the subsequent images, the overall shape of the group may change sequentially. As an angle which an observer views an automotive lamp changes sequentially, the observer may perceive a moving shape in which the sizes or locations of white lines gradually adjusted against a dark background. For example, the observer may perceive a moving shape such as waves.

In FIG. 39, the low luminosity region may be configured to form the background of the image, and the high luminosity regions form the foreground of the image. However, a high luminosity region may also form the background of the image, and low luminosity regions may also form the foreground of the image. In FIGS. 36 through 39, six images adjusted sequentially. Accordingly, six image segments may be positioned to correspond to one diffusion lens. Of the six image segments, an observer may perceive a light pattern of a particular image segment based on an angle at which the observer views an automotive lamp.

For example, light patterns of a plurality of image segments corresponding to a plurality of successive diffusion lenses may be perceived simultaneously by the observer. In this case, the light patterns of the image segments may correspond to a light pattern of a particular image among the six images.

Therefore, the number of images that adjust sequentially may vary according to an exemplary embodiment. Accordingly, the number of image segments positioned to correspond to each diffusion lens may vary. Until now, a case where a plurality of images change sequentially has been described. For example, when an image layer may include six images, the images may be adjusted in order of 1→2→3→4→5→6 based on an angle at which an observer views an automotive lamp. For example, when the angle at which the observer views the automotive lamp exceeds an angle at which the observer views the sixth image, the first image appears. In particular, when the angle at which the observer views the automotive lamp changes continuously, the images are repeated in order of 1→2→3→4→5→6.

Continuity may exist between adjacent images but may not exist between distant images. For example, continuity may exist between the first image and the second image but may not exist between the first image and the third image. Therefore, a moving shape may be provided when a light pattern of the second image may be perceived after a light pattern of the first image may be perceived. However, a discontinuous moving shape may be provided when a light pattern of the third image may be perceived after the light pattern of the first image may be perceived. Likewise, a discontinuous moving image may be provided when the light pattern of the first image may be perceived after a light pattern of the sixth image may be perceived. Therefore, an automotive lamp according to an exemplary embodiment may provide a continuous moving image even when an observer' viewing angle changes continuously.

Figure 40:
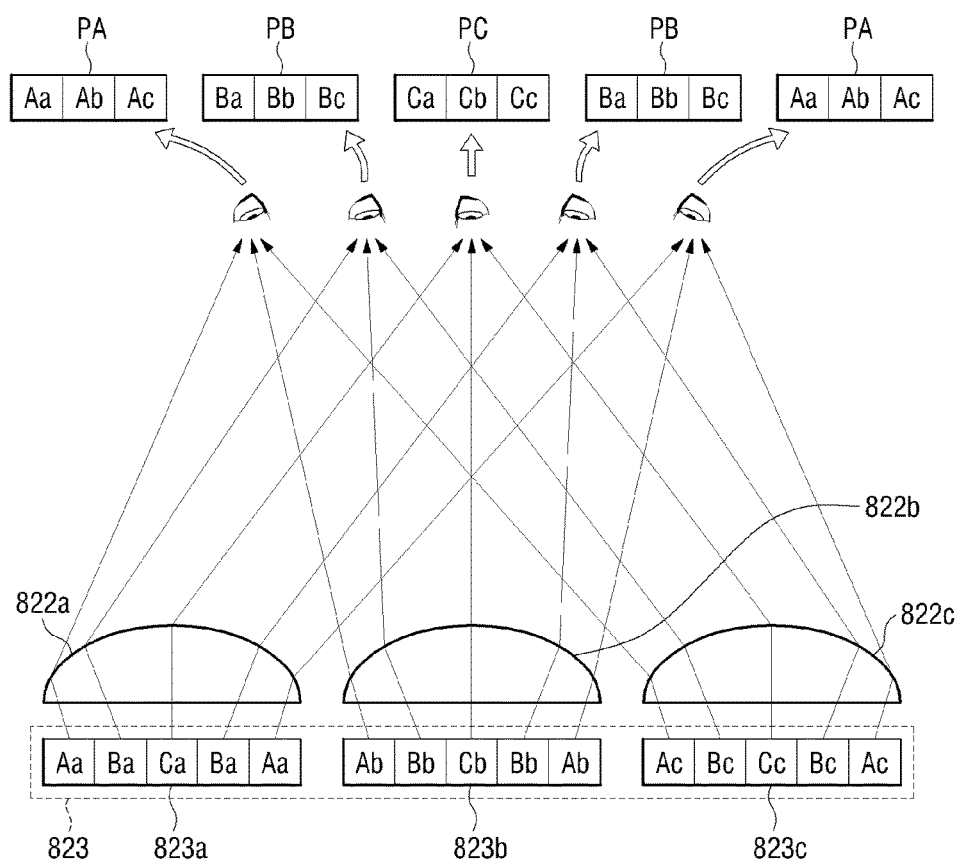
FIG. 40 illustrates an exemplary principle that a light pattern of a continuous image is perceived according to an angle at which the automotive lamp of FIG. 33 is viewed.

FIG. 40 illustrates the principle that a light pattern of a continuous image may be perceived based on an angle at which the automotive lamp 80 of FIG. 33 is viewed. As the image layer 821 of FIG. 33 is repositioned by an image layer 823 of FIG. 40, a light pattern of a continuous image may be perceived based on an angle at which an observer views the automotive lamp 80. Referring to FIG. 40, an image segment group 823a, 823b or 823c may be positioned to correspond to each diffusion lens 822a, 822b or 822c of the lenticular lens 822.

Each of the different images described above may be split into a plurality of image segments. For example, an A image may be split into Aa, Ab and Ac, a B image may be split into Ba, Bb and Bc, and a C image may be split into Ca, Cb and Cc. The Aa, Ab, Ac, Ba, Bb, Bc, Ca, Cb and Cc image segments may be included in the image layer 823 such that they are positioned to correspond to the different diffusion lenses 822a through 822c of the lenticular lenses 822. In particular, the Aa, Ba and Ca image segments may form the group 823a corresponding to one diffusion lens 822a the Ab, Bb and Cb image segments may form the group 823b corresponding to one diffusion lens 822b, and the Ac, Bc and Cc image segments may form the group 823c corresponding to one diffusion lens 822c.

As the observer's viewing angle changes sequentially in a particular direction, light patterns of different images may be switched in a particular switching order (hereinafter, referred to as a first switching order). Therefore, as the light patterns of the different images are switched, a continuous moving shape may be provided in the first switching order. To this end, the Aa, Ab, Ac, Ba, Bb, Bc, Ca, Cb and Cc image segments may be positioned to correspond to the diffusion lenses 822a through 822c such that a continuous moving shape may be provided in the first switching order. In particular, the Aa, Ab, Ac, Ba, Bb, Bc, Ca, Cb and Cc image segments may be positioned in order of Aa→Ba→Ca, in order of Ab→Bb→Cb, and in order of Ac→Bc→Cc.

For example, when the observer's viewing angle changes sequentially in a particular direction, it may be understood that the position of the observer viewing the automotive lamp 80 changes in the particular direction. In particular, when the observer viewing the automotive lamp 80 from the front or rear of a vehicle moves to the left or to the right, the viewing angle of the observer changes sequentially in a corresponding direction. Therefore, when the viewing angle changes sequentially in a particular direction, it means that the observer continuously moves to the left or to the right and does not change his or her direction. The particular direction of the viewing angle will hereinafter be referred to as an angle forward direction.

When the viewing angle changes sequentially in the angle forward direction after exceeding a threshold, the light patterns of the different images may be switched in an order (hereinafter, referred to as a second switching order) opposite to the first switching order. Therefore, a continuous moving shape may be provided in the second switching order. To this end, the Aa, Ab, Ac, Ba, Bb, Bc, Ca, Cb and Cc image segments may be positioned to correspond to the diffusion lenses 822a through 822c such that a continuous moving shape may be provided in the second switching order. In particular, the Aa, Ab, Ac, Ba, Bb, Bc, Ca, Cb and Cc image segments may be positioned in order of Ca→Ba→Aa, in order of Cb→Bb→Ab, and in order of Cc→Bc→Ac.

Ultimately, the image segment group 823a including the Aa, Ba and Ca image segments arranged in order of Aa→Ba-→Ca→Ba→Aa, the image segment group 823b including the Ab, Bb and Cb image segments arranged in order of Ab→Bb→Cb→Bb→Ab, the image segment group 823c including the Ac, Bc and Cc image segments arranged in order of Ac→Bc→Cc→Bc→Ac may be disposed on the diffusion lenses 822a through 822c.

The image layer 823 may be composed of a combination of the image segment groups 823a through 823c and disposed on a rear surface of the lenticular lens 822. The image segment groups 823a through 823c may be printed on the rear surface of the lenticular lens 822, or the image layer 823 may be created in the form of an image film and attached to the rear surface of the lenticular lens 822. The diffusion lenses 822a through 822c may output incident light by refracting the incident light. Since the functions of the diffusion lenses 822a through 822c have been described above with reference to FIG. 34, a detailed description of the functions of the diffusion lenses 822a through 822c will be omitted.

Light patterns (PA) of the Aa, Ab and Ac image segments may be perceived simultaneously by the observer at a certain location, light patterns (PB) of the Ba, Bb and Bc image segments may be perceived simultaneously by the observer at another location, and light patterns (PC) of the Ca, Cb and Cc image segments may be perceived simultaneously by the observer at another location. For example, the light patterns of the Aa, Ab and Ac image segments may be collectively perceived as a light pattern of the Aa, Ab and Ac image segments connected to each other. In particular, a light pattern PA of the A image may be perceived by the observer. Likewise, the observer may perceive a light pattern PB of the B image or a light pattern PC of the C image depending on a viewing direction.

The A, B and C images may provide a continuous moving shape. In particular, the observer may perceive a continuous moving shape by sequentially observing the light patterns PA, PB and PC of the A, B and C images. In addition, as the position of the observer changes continuously, the light patterns PB and PA of the B and A images may be perceived sequentially in order of PB→PA after the light pattern PC of the C image may be perceived. Therefore, it may be possible to provide a moving shape without a discontinuity between a light pattern immediately before the viewing angle exceeds the threshold and a light pattern immediately after the viewing angle exceeds the threshold. For example, the light pattern immediately before the viewing angle exceeds the threshold may be PC, and the light pattern immediately after the viewing angle exceeds the threshold may be PB. In this case, when the observer continuously changes his or her position in a particular direction, he or she may perceive a light pattern of a continuous image.

In FIG. 40, light patterns of three images are perceived sequentially. However, the number of images perceived sequentially may vary according to various exemplary embodiments.

Figure 41:
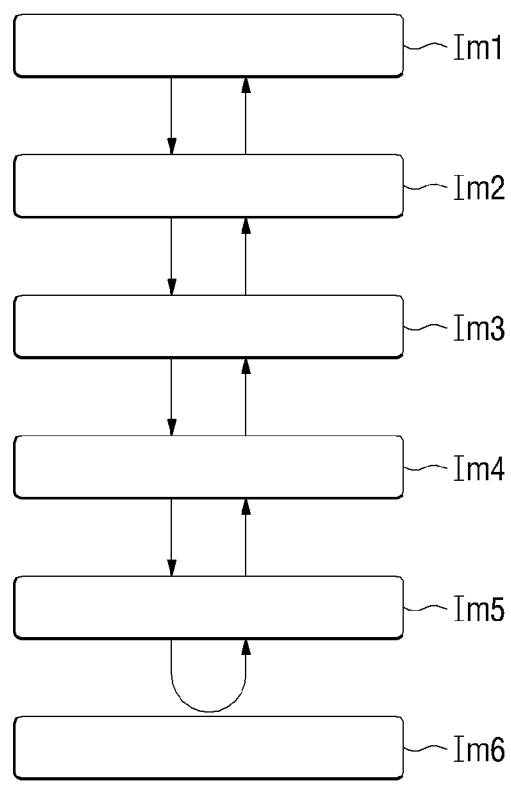
FIG. 41 illustrates an exemplary image group which provides a continuous moving shape according to an exemplary embodiment of the present disclosure.

FIG. 41 illustrates an image group which provides a continuous moving shape according to an exemplary embodiment. Referring to FIG. 41, as an angle at which an observer views the automotive lamp 80 changes, images Im1 through Im6 provided to the observer may be adjusted sequentially.

As the angle at which the observer views the automotive lamp 80 changes sequentially, light patterns of different images may provide a continuous shape having a particular proceeding direction. In particular, the images may be provided in order of Im1→Im2→Im3→Im4→Im5→Im6. In addition, when the angle at which the observer views the automotive lamp 80 changes sequentially after exceeding a threshold, the light patterns of the different images may provide a continuous moving shape having a direction opposite to the particular proceeding direction. In particular, while the images are being provided in order of Im5→Im6, when the observer continuously changes his or her viewing angle by moving in the direction he or she was moving, the images may be provided in order of Im6→Im5→Im4→Im3→Im2→Im1. For example, Im1 through Im6 may be one of the image groups illustrated in FIGS. 36 through 39. In particular, continuity exists between adjacent images. When images are switched as described above, the observer may perceive a light pattern of a continuous image even when his or her viewing angle changes to any angle.

Figure 42:
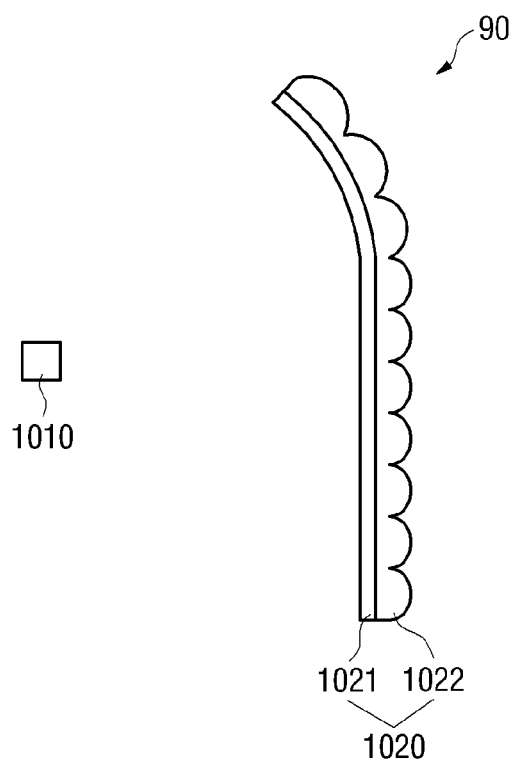
FIG. 42 illustrates an exemplary automotive lamp according to an exemplary embodiment of the present disclosure.

FIG. 42 illustrates an automotive lamp 90 according to an exemplary embodiment. Referring to FIG. 42, the automotive lamp 90 may include a light source 1010 and a light pattern forming component 1020. The light source 1010 irradiates light. At least one light source 1010 may be provided. Since the functions of the light source 1010 are identical or similar to those of the above-described light source 100, a detailed description of the functions of the light source 1010 will be omitted. The light pattern forming component 1020 may be configured to form a light pattern of a different image based on a viewing angle by transmitting light of the light source 1010. In particular, as the viewing angle changes sequentially, light patterns of different images may provide a continuous moving shape.

The light pattern forming component 1020 may include an image layer 1021 and a lenticular lens 1022. The image layer 1021 may include a plurality of different images. The different images may be one of the image groups illustrated in FIGS. 36 through 39. As light patterns of the images may be adjusted sequentially, an observer may perceive a continuous moving shape. The lenticular lens 1022 may be configured to form a light pattern of a specific image at a specific angle at which the observer views the automotive lamp 90 by dispersing light that transmits through the image layer 1021.

The automotive lamp 90 based on the current exemplary embodiment may be a tail lamp. Therefore, the automotive lamp 90 may be provided on both sides of the rear of a vehicle. In addition, the automotive lamp 90 may include a curvature corresponding to the shape of both sides of the rear of the vehicle.

When the automotive lamp 90 is viewed from the rear of the vehicle, the size of a light pattern of each image may vary based on the presence or absence of curvature. In particular, while a light pattern of a component without a curvature may be perceived to have a normal size, a light pattern of a part with a curvature may be perceived to have a smaller size than the normal size. For this reason, the observer may perceive a light pattern of a distorted image.

Hence, the light pattern forming component 1020 based on the current exemplary embodiment may include a curvature region having a curvature. The size of a light pattern formed to correspond to the curvature region may be equal or similar to the size of a light pattern formed to correspond to a flat region. Accordingly, the observer may perceive a light pattern of an image with a normal size ratio achieved by compensating for the size of the light pattern of the curvature part.

Figure 43:
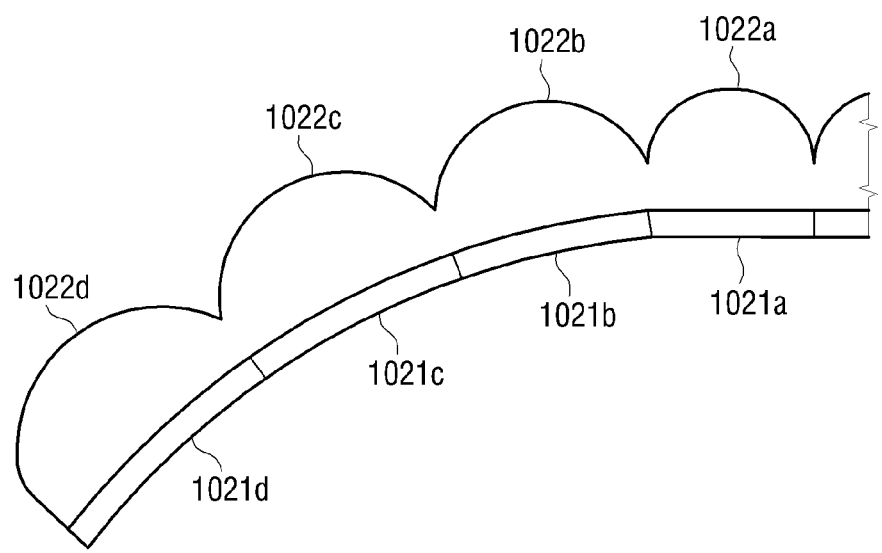
FIG. 43 illustrates an exemplary light pattern forming component according to an exemplary embodiment of the present disclosure.

FIG. 43 illustrates a light pattern forming component 1020 according to an exemplary embodiment. Referring to FIG. 43, the size of a curvature region included in the light pattern forming component 1020 and the size of an image region corresponding to the curvature region among regions of each of different images included in an image layer may be determined by curvature. In particular, as the curvature increases, the curvature region and the image region may become greater than a straight region.

As illustrated in FIG. 43, diffusion lenses 1022b through 1022d and image layer segments 1021b through 1021d in a curvature region may be greater than a diffusion lens 1022a and an image layer segment 1021a in a straight region. In addition, as the curvature increases, the diffusion lenses 1022b through 1022d and the image layer segments 1021b through 1021d in the curvature region may become greater. In particular, since the curvature increases from the right side toward the left side of FIG. 43, the diffusion lenses 1022b through 1022d and the image layer segments 1021b through 1021d may become greater.

In FIGS. 42 and 43, the image layer segments 1021b through 1021d in the curvature region are enlarged. However, the image layer segments 1021b through 1021b may also be reduced according to the direction of the curvature.

FIGS. 44 through 47 illustrate a change in the size of an image segment according to an exemplary embodiment. As described above, each of different images may be split into a plurality of image segments, and the image segments may be included in an image layer such that they are positioned to correspond to different diffusion lenses. In FIGS. 44 through 47, two image segments A and B are included in an image layer IL.

Figure 44:
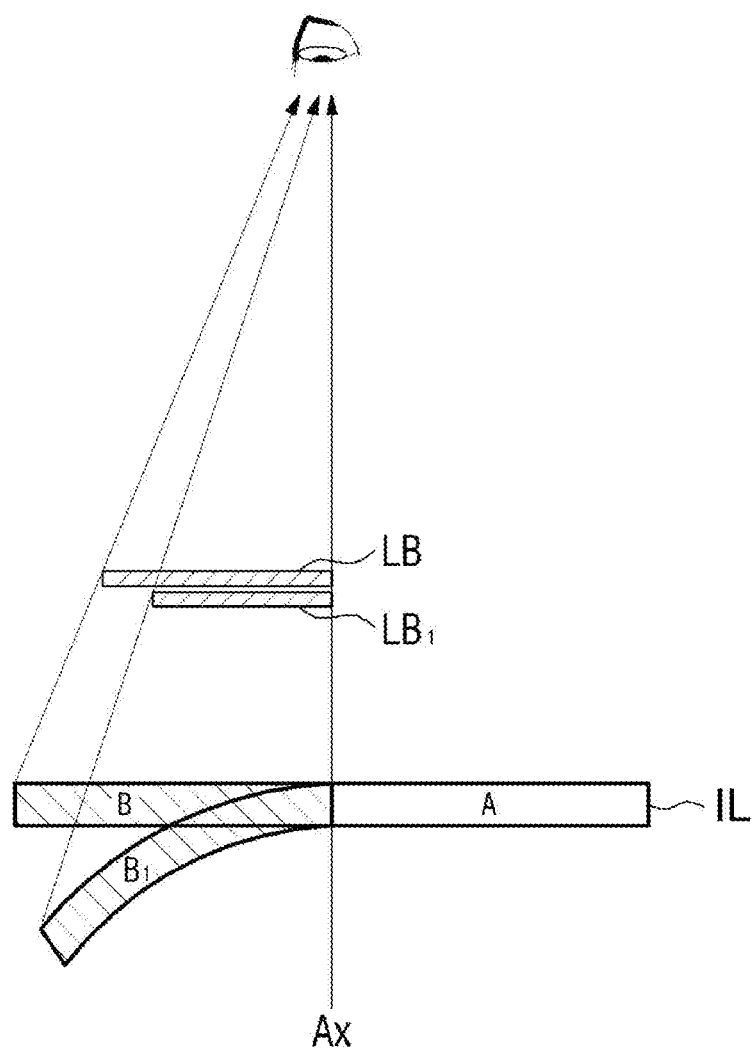
FIGS. 44 through 47 illustrate an exemplary change in the size of an image segment according to an exemplary embodiment of the present disclosure.
Figure 45:
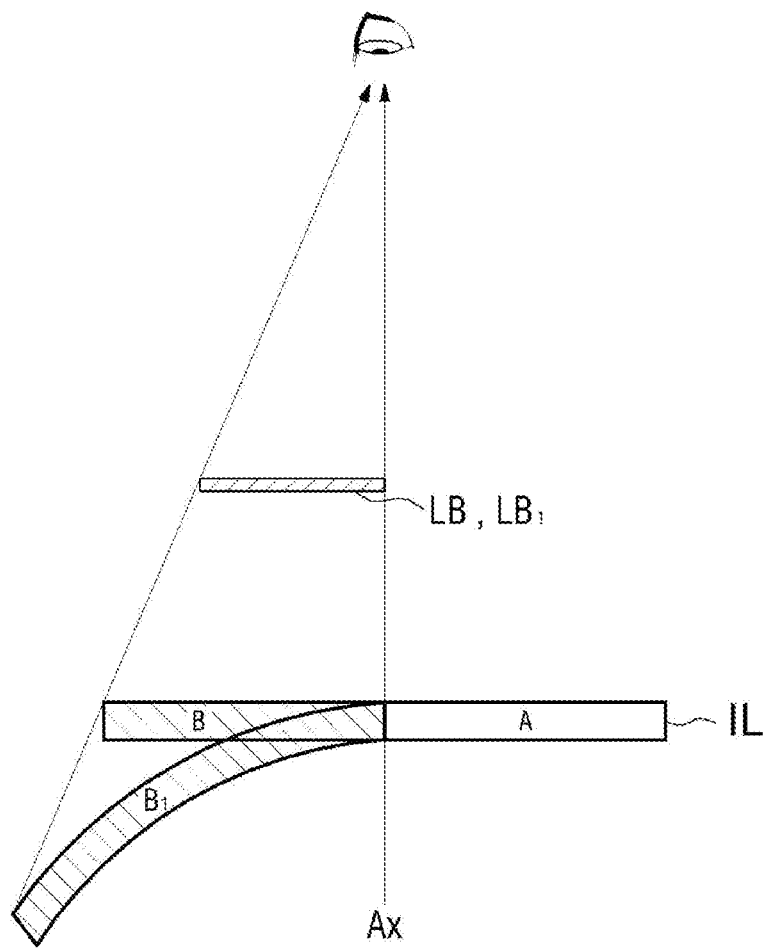

Referring to FIGS. 44 and 45, when a curvature region may be formed in a direction away from an observer, an image segment in the curvature region may be enlarged. As illustrated in the drawings, image segment B may be bent in the direction away from the observer. The bent image segment B will hereinafter be referred to as image segment B1. Thus, image segment B1 may be included in the curvature region of the light pattern forming component 1020.

When image segment B and image segment B1 have equal lengths, light patterns perceived by the observer may have different sizes. In particular, light pattern LB of image segment B may be perceived to be greater than light pattern LB1 of image segment B1. In other words, a light pattern of an image segment existing in a flat region of the light pattern forming component 1020 and a light pattern of an image segment existing in the curvature region of the light pattern forming component 1020 may be perceived to have different sizes.

Therefore, in a case where the image segments include a first image segment included in the flat region of the light pattern forming component 1020 and a second image segment included in the curvature region of the light pattern forming component 1020, the size of the second image segment may be determined such that a light pattern of the first image segment and a light pattern of the second image segment are perceived to have the same size. Specifically, the size of the second image segment may be reduced or enlarged compared with the size of the first image segment such that the light pattern of the first image segment and the light pattern of the second image segment are perceived to have the same size.

In particular, the size of image segment B1 may be increased as illustrated in FIG. 45. When the curvature region may be formed in the direction away from the observer, the size of image segment B1 may be increased. Accordingly, the observer may perceive light pattern LB of image segment B and light pattern LB1 of image segment B1 to have the same size.

Figure 46:
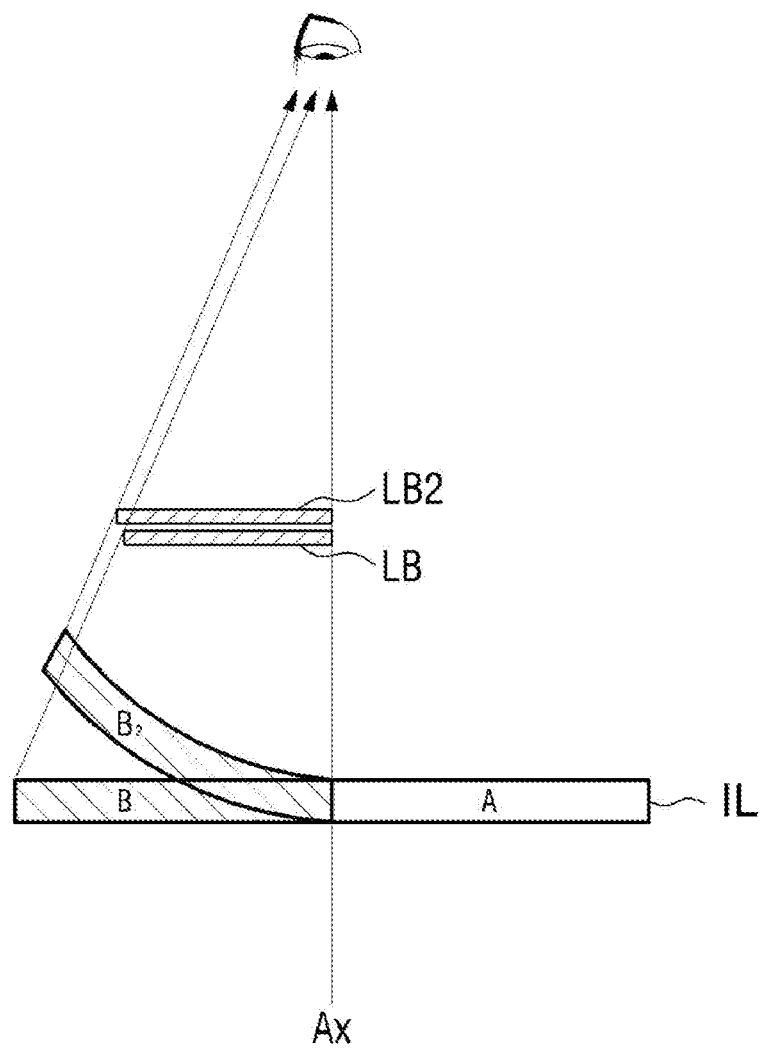
Figure 47:
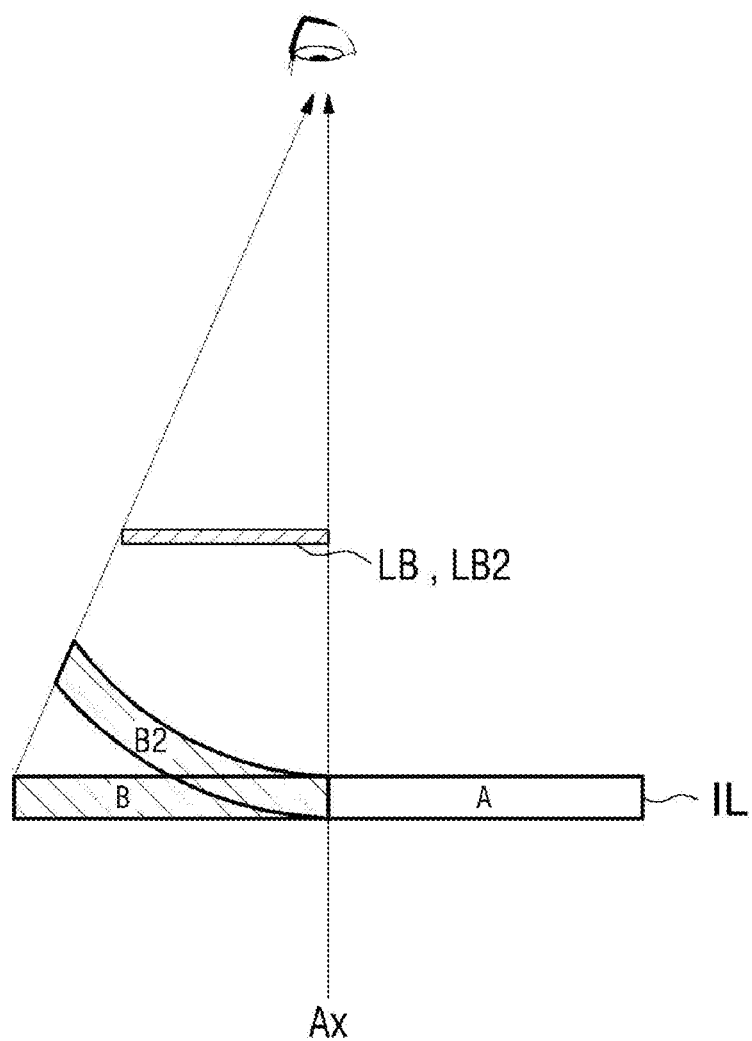

Referring to FIGS. 46 and 47, when the curvature region may be formed in a direction toward the observer, an image segment in the curvature region may be reduced. As illustrated in the drawings, image segment B may be bent in the direction toward the observer. The bent image segment B will hereinafter be referred to as image segment B2. Thus, image segment B2 may be included in the curvature region of the light pattern forming component 1020. When image segment B and image segment B2 have equal lengths, light patterns perceived by the observer may have different sizes. In particular, light pattern LB of image segment B may be perceived to be smaller than light pattern LB2 of image segment B2. In other words, a light pattern of an image segment existing in the flat region of the light pattern forming component 1020 and a light pattern of an image segment existing in the curvature region of the light pattern forming component 1020 may be perceived to have different sizes.

Therefore, in a case where the image segments include a first image segment included in the flat region of the light pattern forming component 1020 and a second image segment included in the curvature region of the light pattern forming component 1020, the size of the second image segment may be determined such that a light pattern of the first image segment and a light pattern of the second image segment are perceived to have the same size. Specifically, the size of the second image segment may be reduced or enlarged compared with the size of the first image segment such that the light pattern of the first image segment and the light pattern of the second image segment are perceived to have the same size. In particular, the size of image segment B2 may be reduced as illustrated in FIG. 47. When the curvature region may be formed in the direction toward the observer, the size of image segment B2 may be reduced. Accordingly, the observer may perceive light pattern LB of image segment B and light pattern LB2 of image segment B2 to have the same size.

As described above, an automotive lamp according to an exemplary embodiment may be configured to form a stereoscopic image by transmitting light emitted from a light source through a lenticular lens. Therefore, the automotive lamp enables a product to be more clearly distinguished from other products.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation.

What is claimed is:

1. An automotive lamp, comprising:
   a light source; and
   a light pattern forming component configured to form a plurality of light patterns by transmitting light emitted from the light source,
   wherein the light pattern forming component enables a light pattern of a different image to be observed based on a viewing angle, and light patterns of different images provide a continuous motion as the viewing angle sequentially changes in a specific direction, and
   wherein different images are separated into an image segment, the image segment that is passed through a lenticular lens is connected to form a specific light pattern, and the image segment is dispersed based on a location on a rear surface of a diffusion lens.

2. The automotive lamp of claim 1, wherein the light pattern forming component includes,
   an image layer having the different images,
   wherein the lenticular lens is configured to form a light pattern of a specific image among the different images at a specific viewing angle by dispersing light that transmits through the image layer.

3. The automotive lamp of claim 2, wherein each of the different images are separated into a plurality of image segments, and the plurality of image segments are included in the image layer to correspond to different diffusion lenses which form the lenticular lens.

4. The automotive lamp of claim 2, wherein each of the different images is configured to determine a transmission pattern of the light.

5. The automotive lamp of claim 4, wherein each of the different images includes a high luminosity region and a low luminosity region based on the transmission pattern of the light.

6. The automotive lamp of claim 5, wherein the high luminosity region and the low luminosity region are determined based on a thickness of the image layer, whether the image layer is coated with paint for forming the images, and the degree to which the image layer is coated with the paint.

7. The automotive lamp of claim 5, wherein the different images are configured to provide the continuous motion through a sequential adjustment in the size of each of the high luminosity region and the low luminosity region.

8. The automotive lamp of claim 5, wherein the different images are configured to provide the continuous motion through a random adjustment in at least one of the area and location of each of the high luminosity region and the low luminosity region.

9. The automotive lamp of claim 5, wherein the different images are configured to provide the continuous motion as the high luminosity region sequentially changes to the low luminosity region or as the low luminosity region sequentially changes to the high luminosity region.

10. The automotive lamp of claim 5, wherein the different images are configured to provide the continuous motion through a sequential change in at least one of the area and location of each of the high luminosity region and the low luminosity region.

11. The automotive lamp of claim 4, wherein each of the different images includes a plurality of regions in which a first luminosity of several regions is different from a second luminosity of other regions, and determined as a difference of luminosity between each region.

12. The automotive lamp of claim 4, wherein each of the different images includes a plurality of regions in which luminosity of several regions is different from other regions and is determined as a boundary between a high luminosity region and a low luminosity region.

* * * * *